(12) United States Patent
Iwakami et al.

(10) Patent No.: US 9,100,511 B2
(45) Date of Patent: Aug. 4, 2015

(54) IMAGE READING DEVICE AND IMAGE READING SYSTEM

(71) Applicant: PFU Limited, Kahoku-shi, Ishikawa (JP)

(72) Inventors: Osamu Iwakami, Ishikawa (JP); Shu Nishikawa, Ishikawa (JP); Masahito Sakui, Ishikawa (JP); Yoshinobu Araya, Ishikawa (JP)

(73) Assignee: PFU Limited, Ishikawa (JP)

( * ) Notice: Subject to any disclaimer, the term of this patent is extended or adjusted under 35 U.S.C. 154(b) by 0 days.

(21) Appl. No.: 14/080,667

(22) Filed: Nov. 14, 2013

(65) Prior Publication Data

US 2014/0226176 A1   Aug. 14, 2014

(30) Foreign Application Priority Data

Feb. 8, 2013   (JP) .................................. 2013-023718

(51) Int. Cl.
*H04N 1/00*   (2006.01)
*H04N 1/32*   (2006.01)

(52) U.S. Cl.
CPC ......... *H04N 1/00013* (2013.01); *H04N 1/0009* (2013.01); *H04N 1/00076* (2013.01); *H04N 1/3263* (2013.01); *H04N 1/32122* (2013.01); *H04N 1/32657* (2013.01); *H04N 1/32694* (2013.01); *H04N 2201/3205* (2013.01); *H04N 2201/3214* (2013.01); *H04N 2201/3215* (2013.01); *H04N 2201/3216* (2013.01); *H04N 2201/3219* (2013.01); *H04N 2201/3274* (2013.01)

(58) Field of Classification Search
USPC .............. 358/1.14, 1.15, 1.1–1.18, 448, 474; 714/39, 763; 709/224
See application file for complete search history.

(56) References Cited

U.S. PATENT DOCUMENTS

| 5,740,490 | A | 4/1998 | Yamashita et al. |  |
|---|---|---|---|---|
| 6,177,934 | B1 * | 1/2001 | Sugiura et al. | 715/748 |
| 7,768,676 | B2 * | 8/2010 | Kimura et al. | 358/474 |
| 8,867,107 | B1 * | 10/2014 | Shimizu | 358/474 |
| 2007/0220353 | A1 * | 9/2007 | Iura et al. | 714/39 |
| 2010/0198967 | A1 * | 8/2010 | Takahashi | 709/224 |
| 2010/0333199 | A1 * | 12/2010 | Gianoulakis et al. | 726/22 |
| 2011/0069340 | A1 * | 3/2011 | Asai | 358/1.15 |
| 2011/0279840 | A1 * | 11/2011 | Iwayama | 358/1.12 |

FOREIGN PATENT DOCUMENTS

| JP | 3422399 B2 | 6/2003 |
|---|---|---|
| JP | 4849254 B2 | 1/2012 |

\* cited by examiner

*Primary Examiner* — Allen H Nguyen
(74) *Attorney, Agent, or Firm* — McDermott Will & Emery LLP

(57) ABSTRACT

An image reading device includes an information storage unit that stores, in an associated manner, error information on errors occurred due to a previous scan operation and operator information on an operator who produced errors, and an error analyzing unit that determines whether an error occurred due to a scan operation of a specific operator is an operator-dependent error, based on the error information and the operator information stored in the information storage unit.

6 Claims, 16 Drawing Sheets

FIG.2

| SCAN EXECUTION TIME | OPERATOR | SCAN COUNT | ERROR OCCURRENCE TIME | ERROR CODE |
|---|---|---|---|---|
| 10/10/2012 12:01:30 | User01 | 50 | 10/10/2012 12:01:40 | ERROR CODE 001 |
| | | | 10/10/2012 12:01:45 | ERROR CODE 002 |
| 10/11/2012 8:59:30 | User03 | 10 | 10/11/2012 8:59:59 | ERROR CODE 001 |
| ... | ... | ... | ... | ... |

CASE WHERE THERE IS NO PROBLEM WITH ALL THE OPERATORS

CASE WHERE THERE IS A PROBLEM WITH OPERATOR B

CASE WHERE THERE IS A
PROBLEM WITH OPERATOR B

CASE WHERE OPERATOR B
PROTRUDES BUT IS IN
ALLOWABLE RANGE OF
DEVICE ACTUAL VALUE

FIG.15

| SCANNER DEVICE | SCAN EXECUTION TIME | OPERATOR | SCAN COUNT | ERROR OCCURRENCE TIME | ERROR CODE |
|---|---|---|---|---|---|
| Scanner01 | 10/10/2012 12:01:30 | User01 | 50 | 10/10/2012 12:01:40 | ERROR CODE 001 |
| Scanner02 | 10/12/2012 8:01:30 | User99 | 10 | 10/12/2012 8:01:40 | ERROR CODE 002 |
| Scanner01 | 10/15/2012 7:01:30 | User100 | 5 | 10/15/2012 7:01:40 | ERROR CODE 002 |
| ... | ... | ... | ... | ... | ... |

IMAGE READING DEVICE AND IMAGE READING SYSTEM

CROSS-REFERENCE TO RELATED APPLICATION(S)

This application is based on and claims the benefit of priority from Japanese Patent Application No. 2013-023718, filed on Feb. 8, 2013, the entire contents of which are incorporated herein by reference.

BACKGROUND OF THE INVENTION

1. Field of the Invention

The invention relates to an image reading device, and an image reading system.

2. Description of the Related Art

In the conventional art, to solve errors such as a paper jam or a multiple feed occurring in an image reading device such as a copying machine or a facsimile machine, a technique of analyzing an error occurrence count and a trend thereof to displays a warning message, determine the time to perform maintenance of the device, predict and suggest the optimal countermeasure time, and requesting maintenance to a customer engineer is known (for example, see Japanese Patent No. 3,422,399 and Japanese Patent No. 4,849,254).

However, in these conventional arts, errors resulting from an operator who uses the image reading device are not distinguished from errors resulting from the state of the image reading device itself. The countermeasure methods for operator-dependent errors and device-dependent errors are different. For example, a scanner device which is an example of the image reading device has such characteristics that the occurrence frequency of the operator-dependent errors is higher than other devices since the type of sheet to be read and the sheet setting operation are likely to change from person to person. Therefore, to suggest an appropriate countermeasure method for errors occurring in the image reading device, in particular, the scanner device, it is desirable to determine the factors of the errors with high accuracy.

SUMMARY OF THE INVENTION

The present invention is directed to an image reading device that determines the factors of the errors with high accuracy.

One aspect of the present invention relates to an image reading device. The image reading device includes a storage unit that stores, in an associated manner, error information on errors occurred due to past image reading operations and operator information on operators who produced the errors; and a determining unit that determines whether an error occurred due to the image reading operation of a specific operator among the operators is an operator-dependent error, based on the error information and the operator information stored in the storage unit.

BRIEF DESCRIPTION OF THE DRAWINGS

FIG. 2 is a diagram illustrating an example of a configuration of storage information stored in an information storage unit in FIG. 1;

FIG. 15 is a diagram illustrating an example of a configuration of storage information stored in an information storage unit in FIG. 14;

DETAILED DESCRIPTION OF THE PREFERRED EMBODIMENTS

Figure 1:
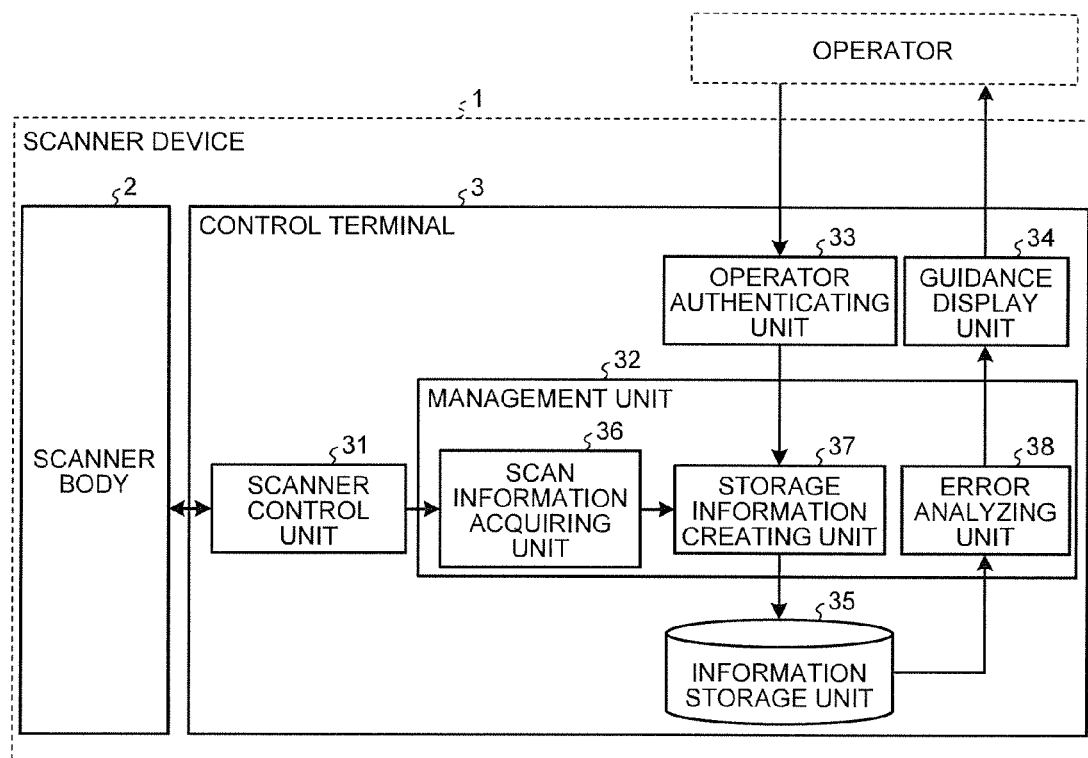
FIG. 1 is a functional block diagram of a scanner device as an example of an image reading device according to a first embodiment of the invention.

Hereinafter, embodiments of an image reading device and an image reading system according to the invention will be described based on the drawings. In the following drawings, the same or corresponding portions will be denoted by the same reference numerals, and redundant description thereof will not be provided.

First Embodiment

A first embodiment of the invention will be described with reference to FIGS. 1 to 13B. In the first embodiment, a scanner device 1 is described as an example of an image reading device that reads a reading target medium to generate image information or prints the same on another medium. First, referring to FIGS. 1 and 2, a configuration of the scanner device 1 according to the present embodiment will be described. FIG. 1 is a functional block diagram of a scanner device as an example of an image reading device according to the first embodiment, and FIG. 2 is a diagram illustrating an example of a structure of storage information stored in an information storage unit in FIG. 1.

As illustrated in FIG. 1, the scanner device 1 includes a scanner body 2 and a control terminal 3.

The scanner body 2 includes various constituent components such as an optical system, a driving system related to a scanner function. The scanner body 2 creates image data of a reading target medium under the control of the control terminal 3. Examples of a reading target medium include paper, cards, and books.

The control terminal 3 is communicably connected to the scanner body 2 by a standard interface and controls the operations of the respective constituent components included in the scanner body 2 by communication with the scanner body 2. Moreover, in particular, in the present embodiment, when an error resulting from a scan operation occurs, the control terminal 3 determines the factors of the error based on the history of a past scan operation. Moreover, the control terminal 3 displays guidance information for error countermeasures to instruct the operator according to the error determination result.

In relation to the above function, the control terminal 3 is configured to realize the functions of a scanner control unit 31, a management unit 32, an operator authenticating unit 33, a guidance display unit 34, and an information storage unit 35.

The scanner control unit 31 controls the operations of the constituent components related to the scanner function of the scanner body 2 to perform a scan operation. Moreover, when the scan operation is performed, the scanner control unit 31 outputs scan information related to the scan operation to a scan information acquiring unit 36 of the management unit 32.

The management unit 32 manages the scan operation of the scanner device 1. The management unit 32 collects information on a scan operation to store the same as a history and determines the type of an error based on the history when an error resulting from the scan operation occurs to switch a guidance (countermeasure information) presented to the operator according to the error type. The management unit 32 is configured to realize the respective functions of the scan information acquiring unit 36, a storage information creating unit 37, and an error analyzing unit 38.

The scan information acquiring unit 36 collects scan information related to the scan operation from the scanner body 2 via the scanner control unit 31. The scan information includes at least the following items of information:

Scan count (a total number of sheets scanned by an operator regardless of normal or error)

Error code of scan error (details of error occurrence position)

Scan start time

Scan error occurrence time (all error codes and occurrence time are recorded if a plurality of errors has occurred)

The storage information creating unit 37 creates storage information to be stored in the information storage unit 35 described later. The storage information is information that indicates a scan operation of the operator and a history of an error occurrence resulting from the scan operation. Specifically, the storage information associates the scan information with "operator information" for identifying the operator that performed the scan operation related to the scan information. The operator information is acquired from the operator authenticating unit 33 described later.

The error analyzing unit 38 determines the type of error when an error resulting from a scan operation occurs. The error analyzing unit 38 identifies two types of error which are a "device-dependent error" that occurs depending on the state of a device itself such as contamination or deterioration of the components of the scanner device 1 and an "operator-dependent error" that occurs depending on an operator such as setting or operational errors of the operator as the types of error that occurs resulting from the scan operation.

Moreover, the error analyzing unit 38 determines countermeasure information presented to the operator according to the determined error type. The countermeasure information is information on an error countermeasure method presented to the operator to solve errors such as an instruction on an operation flow of the scan operation or a guidance on device setting. The error analyzing unit 38 selects different countermeasure information for the device-dependent error and the operator-dependent error. Moreover, the error analyzing unit 38 includes a plurality of items of countermeasure information for the operator-dependent error and selects one of the items. The error analyzing unit 38 measures an error improvement effect of one countermeasure information presented to the operator according to the occurrence of the operator-dependent error and appropriately switches the countermeasure information based on the error improvement effect. An error determining process and a countermeasure information selecting process of the error analyzing unit 38 will be described with reference to FIGS. 3 to 13B.

The operator authenticating unit 33 authenticates an operator that performs a scan operation. The authentication process of the operator authenticating unit 33 can employ various known processes. For example, when the control terminal 3 is implemented on a personal computer, the operator can be authenticated by allowing the operator to input a login account and a password and comparing these items of information with user information stored in the device. As another example of the authentication process, authentication information (identification information, password, and the like) that is personally input by the operator or that is acquired via an IC card reader from an IC card presented by the operator may be compared with the user information.

The guidance display unit 34 displays a message of the countermeasure information output from the error analyzing unit 38 and presents error countermeasures to the operator.

The information storage unit 35 stores the storage information created by the storage information creating unit 37. As illustrated in FIG. 2, the information storage unit 35 stores the respective items of "scan execution time," "operator," "scan count," "error occurrence time," and "error code" in correlation as the storage information. When an error does not occur in a scan operation, only "scan execution time," "operator," and "scan count" are recorded, and the items of information "error occurrence time" and "error code" are not recorded.

The control terminal 3 is a computer that physically includes a central processing unit (CPU), a random access memory (RAM), a read only memory (ROM), and the like. All or part of the functions of the control terminal 3 (in particular, the functions of the scanner control unit 31 and the management unit 32) are realized when an application program stored in the ROM is loaded onto the RAM and executed by the CPU, whereby the data in the RAM and the ROM is read and written. Moreover, the control terminal 3 includes an input device such as a keyboard or a mouse, a display device such as a display, and a communication device such as an input-output port. All or part of the respective functions of the control terminal 3 are realized when the application program executed by the CPU inputs an instruction operation of the operator, determines the error type, selects the countermeasure information, displays messages such as an error determination result or an error countermeasure guidance to the operator, and communicates with the scanner body 2 using these devices.

Moreover, the application program may be stored in a non-transitory computer readable recording medium and may be configured as a program product. Here, the "recording medium" includes an arbitrary "portable physical medium" such as a memory card, a USB memory, an SD card, a flexible disk, a magneto-optical disc, a ROM, an EPROM, an EEPROM, a CD-ROM, an MO, a DVD, or a Blu-ray disc. Moreover, the application program may be stored in an application program server connected to the control terminal 3 via an arbitrary network, and the entirety or part thereof may be downloaded as necessary.

Figure 3:
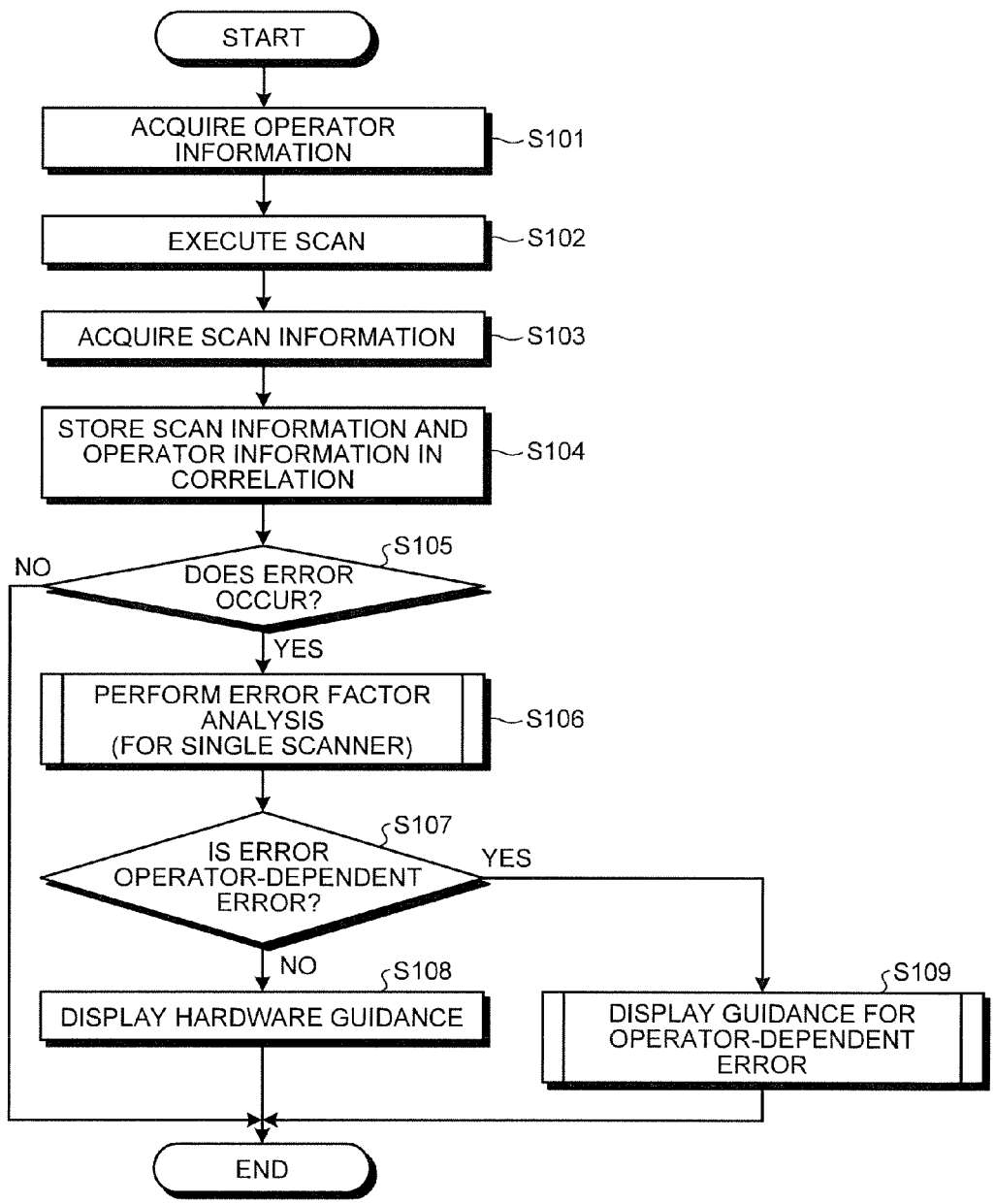
FIG. 3 is a flowchart of an error determining process and a guidance presenting process performed by the scanner device according to the present embodiment.

Next, the operation of the scanner device 1 according to the present embodiment will be described with reference to FIGS. 3 to 13B. FIG. 3 is a flowchart of an error determining process and a guidance presenting process performed by the scanner device of the present embodiment. The control flow illustrated in the flowchart of FIG. 3 is performed by the management unit 32 of the control terminal 3 when an arbitrary operator performs a scan operation using the scanner device 1. Hereinafter, the error determining process and the guidance presenting process performed by the scanner device 1 will be described according to the flowchart of FIG. 3.

First, the storage information creating unit 37 acquires operator information during execution of the scan operation (step S101). The storage information creating unit 37 acquires operator information for identifying an operator authenticated by the authentication process of the operator authenticating unit 33 from the operator authenticating unit 33. The operator information is information for identifying the operator that performs the scan operation, and for example, is login account or identification information of the operator acquired by the authentication process of the operator authenticating unit 33.

Subsequently, the scanner control unit 31 executes the scan operation (step S102), and the scan information acquiring unit 36 acquires the scan information from the scanner control unit 31 (step S013). As described above, the scan information includes scan execution time, scan count, error occurrence time, and error code.

Subsequently, the storage information creating unit 37 stores the scan information acquired at step S103 in the information storage unit 35 in correlation with the operator information acquired at step S101 (step S104: storing step). The storage information creating unit 37 creates storage information that correlates the scan information with the operator information and outputs and stores the created storage information to the information storage unit 35. The storage information stored in the information storage unit 35 is information, for example, that correlates the items of "scan execution time," "operator," "scan count," "error occurrence time," "error code," with each other as illustrated in FIG. 2. The operator information acquired at step S101 may be acquired simultaneously with acquisition of the scan information at step S103.

Subsequently, the error analyzing unit 38 checks whether an error occurs in the present scan operation (step S105). The error analyzing unit 38 determines the presence of error occurrence based on the scan information acquired at step S103, for example. When an error does not occur in the present scan operation (No in step S105), the present control flow ends. On the other hand, when an error occurs in the present scan operation (Yes in step S105), the factor of the error is analyzed (step S106).

Figure 4:
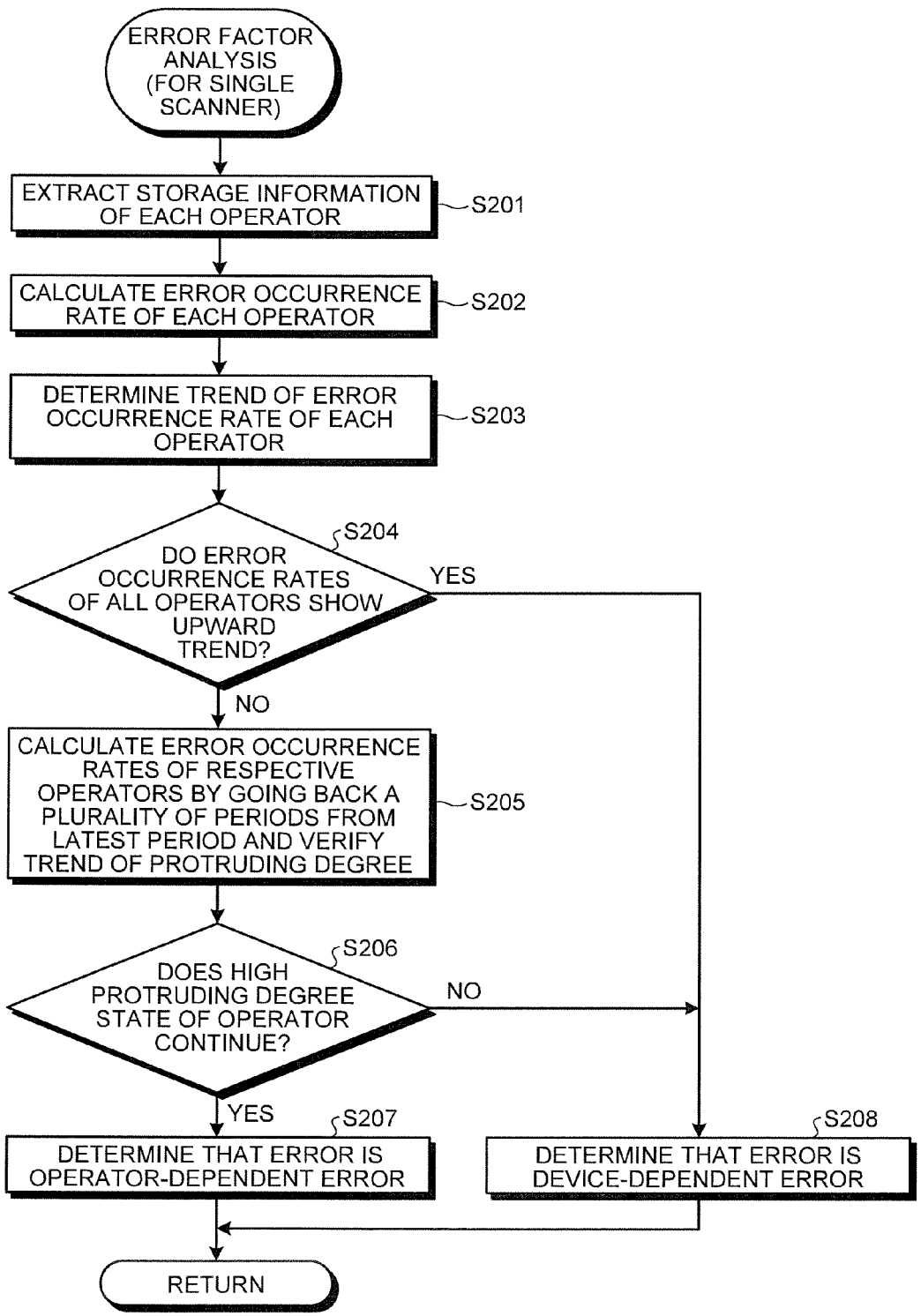
FIG. 4 is a flowchart illustrating a sub-routine process of an error factor analyzing process of step S106 in the flowchart of FIG. 3.

Here, the error factor analyzing process at step S106 will be described in detail with reference to FIG. 4. FIG. 4 is a flowchart illustrating a sub-routine process of the error factor analyzing process of step S106 in the flowchart of FIG. 3.

In the error factor analyzing process of step S106, the error analyzing unit 38 determines the factor of the error occurrence using the following determination methods A and B.

According to the determination method A, an error occurrence count and an error occurrence frequency are aggregated for each operator, and when the error occurrence frequency (hereinafter, referred to as an "error occurrence rate") shows an upward trend for all operators, the error is determined to be a device-dependent error rather than an operator-dependent error.

According to the determination method B, when the error occurrence frequency shows an individual difference in the determination method A and the error occurrence frequency of a specific operator is protrudingly high, the error is determined to be an operator-dependent error.

In this case, the errors that are to be analyzed and aggregated are "errors of which the possible causes are both an operator factor and a device factor and of which the causes are difficult to determine with the error code only" such as a paper jam or a multiple feed. Hardware errors of which the causes are definite such as a power abnormality, a motor abnormality, or an internal circuit abnormality are not analyzed or aggregated because the occurrence position and the countermeasure method thereof are fixed by error codes.

In the error factor analyzing process at step S106, specifically, the error analyzing unit 38 executes a sub-routine process (error factor analysis (for single scanner)) illustrated in the flowchart of FIG. 4.

As illustrated in the flowchart of FIG. 4, in the error factor analyzing process at step S106, first, error determination is performed according to the determination method A (steps S201 to S204) and it is determined which countermeasure is required for the device status. If an error occurs due to the factors of the device itself, since it is not possible to obtain an effect even when an error resulting from an operator is eliminated, first, it is determined whether the device state has a problem. Subsequently, when an error still occurs although the device state has no problem, error determination is performed according to the determination method B (steps S205 and S206), and it is determined whether an operator factor has an influence on the error.

According to the flowchart of FIG. 4, first, the storage information stored in the information storage unit 35 is extracted for each operator (step S201). The error analyzing unit 38 collects the storage information for the respective operators based on the operator information included in the storage information.

Figure 5:
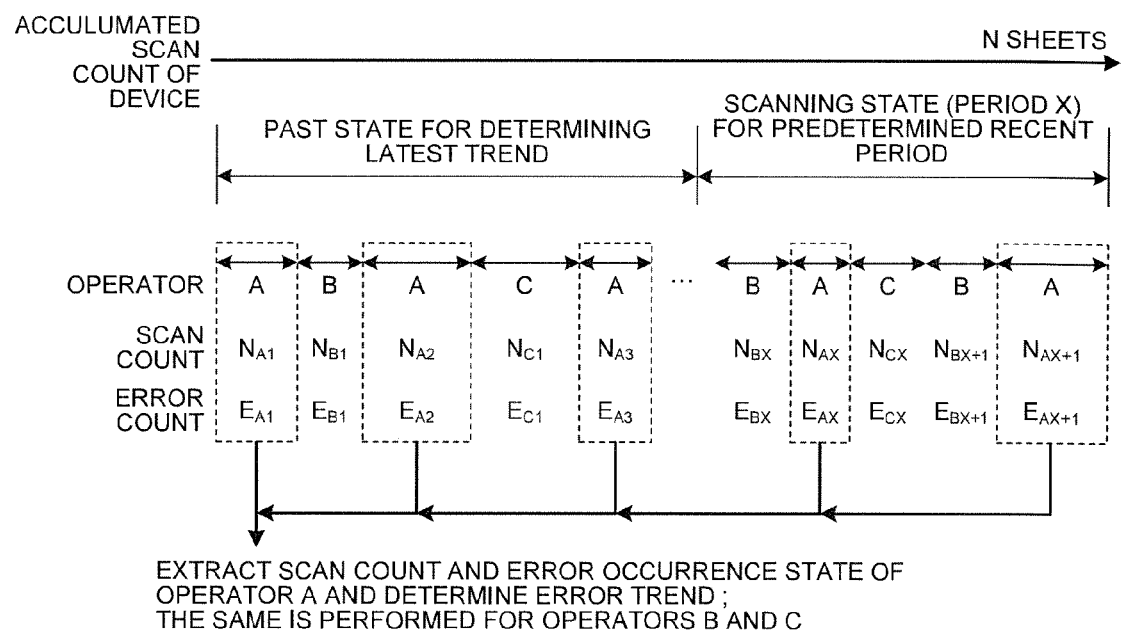
FIG. 5 is a diagram illustrating a use condition of the entire device and a use condition of an operator.

Here, extraction of the storage information for respective operators will be described with reference to FIG. 5. FIG. 5 is a diagram illustrating a use condition of the entire device and a use condition of an operator. In FIG. 5, an accumulated scan count of the entire device is depicted on the horizontal axis, and an operator, a scan count, and an error count are depicted for each scan operation along the horizontal axis. FIG. 5 is a diagram illustrating an example of a case where three operators share a certain scanner.

As illustrated in FIG. 5, although the data of the scan information accumulated and stored in the information storage unit 35 is recorded in a time-sequential order, since the scan information is correlated with the operator information, it is possible to extract the information for each operator. The "period" used in the following description is used to indicate a "period required for scanning a specific number of sheets" using the device and does not indicate an "absolute period." That is, even if the scan count is the same and the "period" is the same, the length of the "period" may not be the same depending on the state of scanning.

As illustrated in FIG. 5, for example, as for the operator A, the error analyzing unit 38 extracts storage information of which the operator information is "A" and collects the information of the scan count and the error count. When an accumulated scanning state of the operator A is extracted, an accumulated scan count of the operator A is $N_{A1}+N_{A2}+\ldots+N_{AX}+N_{AX+1}$ (sheets). Moreover, in a scan state (in the example, a specific number of sheets in the period X) in a predetermined period of the device, the scan count for a predetermined period by the operator A is $N_{AX}+N_{AX+1}$ (sheets), and the error occurrence count resulting from a scan operation in a predetermined period by the operator A is $E_{AX}+E_{AX+1}$ (times).

Returning to FIG. 4, the error occurrence rate for each operator is calculated using the extracted storage information for each operator (step S202). The error analyzing unit 38 calculates the error occurrence rate up to the latest scan operation every predetermined scan count.

The error occurrence rate can be calculated by the following equation, for example.

Error occurrence rate (%)=(Error occurrence count)/(Total sheets read in a predetermined period)

Thus, the error occurrence rate $E_{opA}$ in a predetermined period (the period X in FIG. 5) by the operator A can be calculated using the following equation (1).

Error occurrence rate $E_{opA}$ in a predetermined period by operator $A$=(Error occurrence count resulting from scan operation in a predetermined period by operator $A$)/(Scan count in a predetermined period by operator $A$)=$(E_{AX}+E_{AX+1})/(N_{AX}+N_{AX+1})$ (1)

The same analysis is performed for other operators. For example, in the example of FIG. 5, an error occurrence rate $E_{opB}$ of the operator B and an error occurrence rate $E_{opC}$ of an operator C are calculated by the same method as the equation (1). The collecting period of the data used for the error analyzing unit 38 to compare with a trend of the error occurrence may go further back a predetermined period from a recent predetermined period (the period X in FIG. 5) or may go further back a plurality of periods from the recent predetermined period. In this manner, it is possible to analyze a change or a trend of the error occurrence in further detail.

Subsequently, a trend of the error occurrence rate for each operator is determined (step S203), and it is determined whether the error occurrence rate shows an upward trend for all operators (step S204). When the error occurrence rate shows an upward trend for all operators (Yes in step S204), the requirements of the determination method A are met, and it is determined that the error occurred this time is a device-dependent error rather than an operator-dependent error (step S208: determining step), and the flow returns to the main flow of FIG. 3. On the other hand, when the error occurrence rate of at least one of the operators does not show an upward trend (No in step S204), the requirements of the determination method A are not met, and it is determined that it was not possible for the determination method A to determine whether a device-dependent error has occurred, and the flow proceeds to step S205.

Figure 6:
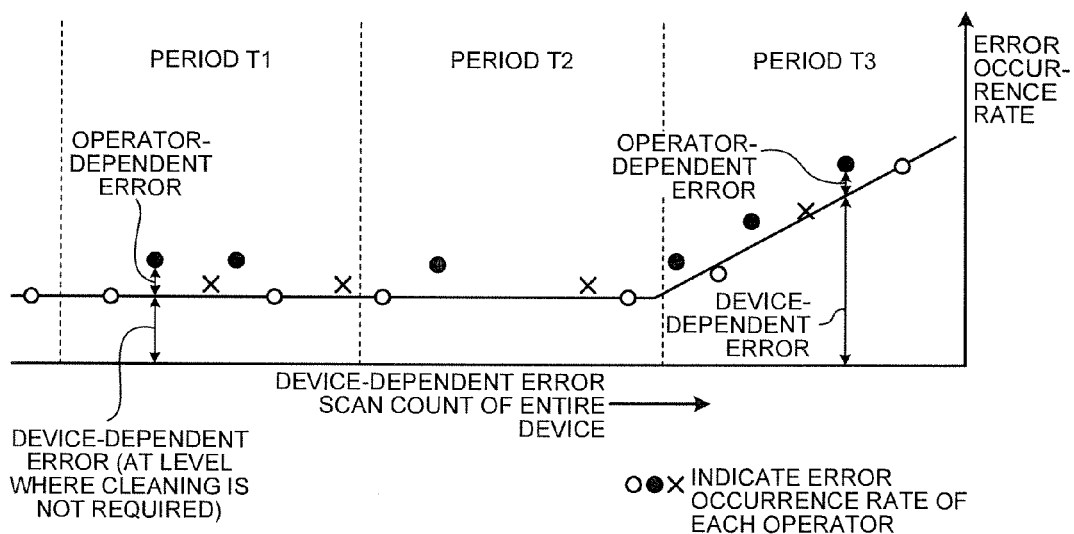
FIG. 6 is a diagram illustrating a trend of an error occurrence rate of each operator when a device-dependent error occurs.
Figure 7:
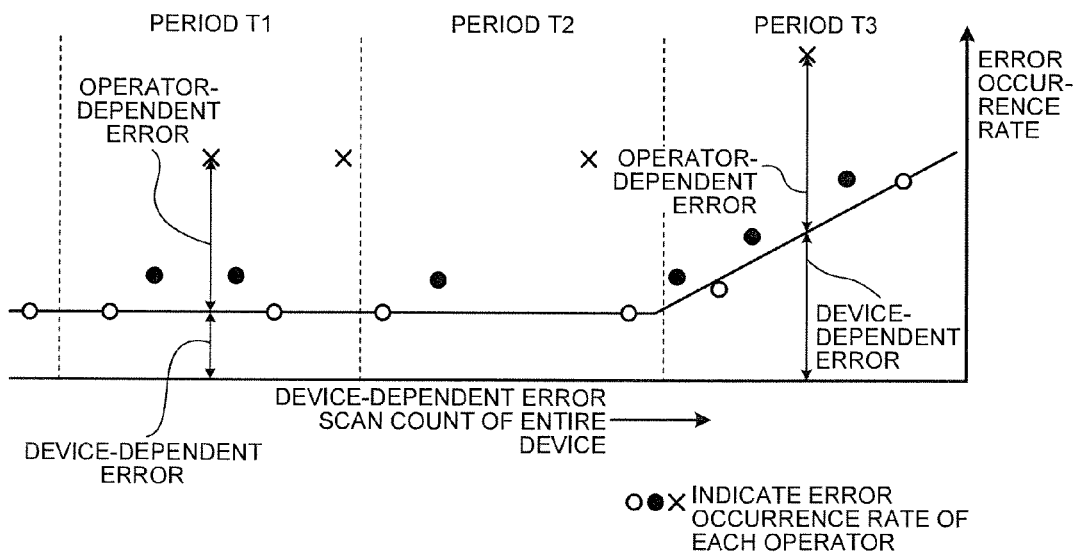
FIG. 7 is a diagram illustrating a trend of an error occurrence rate of each operator when a device-dependent error occurs.

Here, how the device-dependent error occurs will be described with reference to FIGS. 6 and 7. FIGS. 6 and 7 are diagrams illustrating a trend of the error occurrence rate of each operator when a device-dependent error occurs.

In the graphs of FIGS. 6 and 7, an accumulated scan count of the entire device is depicted on the horizontal axis, and the period is closer to the present as it advances from period T1 to period T3 (that is, it advances toward the right side of the drawing). The vertical axes of FIGS. 6 and 7 represent the error occurrence rate. The symbols white circles, black circles, and X in the graphs of FIGS. 6 and 7 represent the error occurrence rate for each operator. The solid line in the graphs represents an occurrence level of a device-dependent error. As indicated by periods T1 and T2 in FIGS. 6 and 7, in general, the device-dependent error occurs at a certain rate even though contamination does not progress. When period T3 begins, the contamination of the device progresses and the device-dependent error starts increasing.

The difference between the solid-line graphs and the error occurrence rates of three operators plotted in the graphs of FIGS. 6 and 7 can be regarded as an operator-dependent error of each of the operators. In FIGS. 6 and 7, for the sake of convenience, it is assumed that the occurrence rate of the operator-dependent error included in the errors of the respective operators is constant on average.

FIG. 6 is a graph illustrating a case where an operator of which the condition is protrudingly bad (that is, an operator of which the error occurrence rate is extremely high) is not present. As illustrated in FIG. 6, when periods T1 and T2 are compared, the error occurrence rate does not show an upward trend for all operators. Thus, it can be easily predicted from an error occurrence trend that the error occurrence rate in periods T1 and T2 is in such a level that the device-dependent error is not a problem. However, in period T3, the device-dependent error has an influence on the error occurrence of all operators and the overall error occurrence rate shows an upward trend. Thus, it can be determined that a device-dependent error begins to occur in such a level which needs to be taken countermeasure, in period T3, from the error occurrence trend.

FIG. 7 is a graph illustrating a case where a specific operator (indicated by symbol × in FIG. 7) has a protruding error occurrence rate as compared to the other operators. The specific operator has conditions that are determined as an operator-dependent error in the determination method B described later. However, in an error occurrence trend of FIG. 7, since the device-dependent error occurs regardless of the operator, and the error occurrence rates of all operators in period T3 show an upward trend, the conditions of the determination method A are met similarly to the example of FIG. 6. Thus, in the example of FIG. 7, it is possible to determine preferentially that the device-dependent error occurs.

Returning to FIG. 4, when it was not possible to determine with the determination method A where a device-dependent error has occurred at step S204, operator-dependent error determination is continuously performed using the determination method B. First, the error occurrence rate of each operator is calculated by going back a plurality of periods from the latest period, and a trend of "protruding degree" is verified (step S205). The error occurrence rate is calculated by repeatedly performing a procedure of calculating a protruding degree of a target operator from the error occurrence state of each operator in a range of periods corresponding to the latest scan count of N and similarly calculating the protruding degree in a range of periods corresponding to another scan count of N. In this manner, it is possible to acquire a trend of the protruding degree of the operator.

Figure 8A:
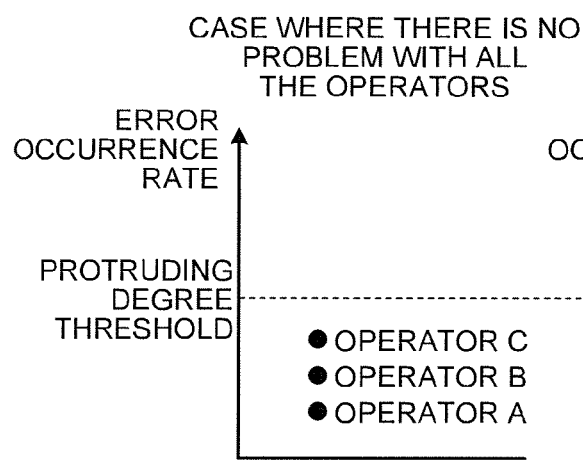
FIG. 8A is a diagram for explaining a protruding degree of an error occurrence rate in a case having no problem with all the operators.
Figure 8B:
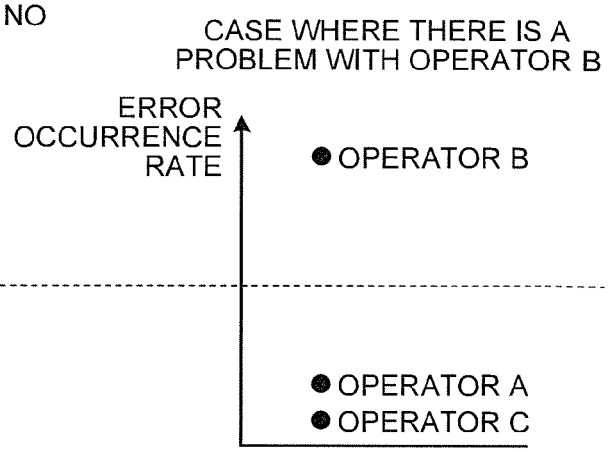
FIG. 8B is a diagram for explaining a protruding degree of an error occurrence rate in a case having a problem with operator B.
Figure 9:
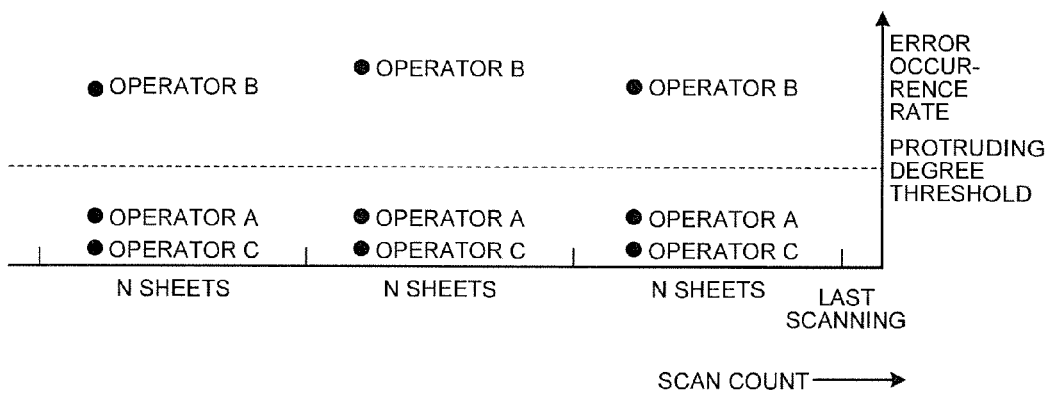
FIG. 9 is a diagram illustrating a trend of the protruding degree when it is determined that an operator-dependent error has occurred.
Figure 10:
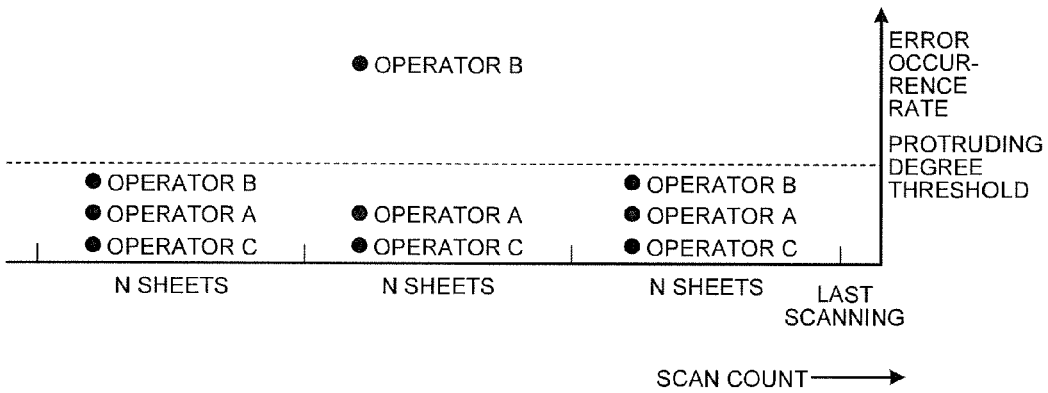
FIG. 10 is a diagram illustrating a trend of the protruding degree when it is determined that an operator-dependent error has not occurred.

Here, how the operator-dependent error occurs will be described with reference to FIGS. 8A to 10. FIGS. 8A and 8B are diagrams for explaining a protruding degree of the error occurrence rate. FIG. 9 is a diagram illustrating a trend of the protruding degree when it is determined that an operator-dependent error has occurred. FIG. 10 is a diagram illustrating a trend of the protruding degree when it is determined that an operator-dependent error has not occurred.

In the determination method B, it is determined whether an error occurrence rate of a specific operator is protrudingly higher than that of the other operators. When the error occurrence rate of the specific operator is extremely high although the operators perform scanning using the same device, it is determined that the error is an operator-dependent error. In the following description, a term "protruding degree" of error occurrence is used as an indicator for determining whether an error occurrence rate of a target operator is extremely higher than the overall error occurrence rate. The concept of the protruding degree will be described with reference to FIGS. 8A and 8B.

FIGS. 8A and 8B are diagrams illustrating a state where the protruding degree of a specific operator (the operator B in FIG. 8B) is high and a state where the protruding degree is low for comparison. The region illustrated in FIG. 8A indicates the error occurrence rate where the protruding degrees of all operators are low, and the region illustrated in FIG. 8B indicates the error occurrence rate where the protruding degree of the operator B is high. The vertical axes of FIGS. 8A and 8B indicate the error occurrence rate, and the error occurrence rates of the operators A, B, and C are plotted by black circles. The error occurrence rate of each operator is calculated by going back the latest scan count of N. Moreover, a predetermined "protruding degree threshold" for the error occurrence rate is set, and the error occurrence rate of each operator is compared with the protruding degree threshold to determine the protruding degree of a specific operator. Specifically, as illustrated in the region of FIG. 8A, when the error occurrence values of all operators A, B, and C are smaller than the protruding degree threshold, it can be determined that the protruding degree is low. On the other hand, as illustrated in the region of FIG. 8B, when the error occurrence rate of a specific operator (the operator B in FIG. 8B) is larger than the protruding degree threshold, and the error occurrence rates of the other operators (the operators A and C in FIG. 8B) are smaller than the protruding degree threshold, it can be determined that the protruding degree of the specific operator is high.

In the determination method B, when such a high protruding degree state shows a continuous trend, it is determined that an error resulting from the specific operator has occurred. This determination will be described with reference to FIGS. 9 and 10. In the graphs of FIGS. 9 and 10, an accumulated scan count of the entire device is depicted on the horizontal axis, and the error occurrence rate is depicted on the vertical axis. On the horizontal axes of FIGS. 9 and 10, the period is closer to the present as it advances toward the right side of the drawing, and the period is divided into sections corresponding to a scan count of N. Moreover, in each section, the error occurrence rates of the operators A, B, and C are plotted by black circles. Further, the protruding degree threshold is depicted by a dot line.

As illustrated in FIG. 9, when a high protruding degree state of a specific operator (the operator B in FIG. 9) continues in a plurality of periods that goes back from the latest scan count of N as well as the latest period, the determination method B determines that the occurred error is an operator-dependent error. On the other hand, as illustrated in FIG. 10, when a high protruding degree state of the specific operator (the operator B in FIG. 10) occurs in one period only, since the high protruding degree state does not continue, the determination method B determines that the occurred error is not an operator-dependent error. By making the determination with consideration of a plurality of periods, it is possible to improve the accuracy in detecting the operator-dependent error by excluding an accidental high protruding degree state.

Returning to FIG. 4, it is determined whether the high protruding degree state of the operator associated with the present error continues (step S206). In this determination, the determination method described with reference to FIGS. 8 to 10 is used. When the determination result shows that the high protruding degree state of the operator occurs continuously (Yes in step S206), it is determined that the requirements of the determination method B are met and the presently occurred error is an operator-dependent error (determination step in step S207), and the flow returns to the main flow. On the other hand, when the high protruding degree state of the operator does not occur continuously (No in step S206), since the requirements of the determination method B are not met, it is determined that the presently occurred error is not an operator-dependent error but a device-dependent error (determination step in step S20), and the flow returns to the main flow.

Returning to the main flow of FIG. 3, it is determined whether the presently occurred error is an operator-dependent error (step S107). When the error is not the operator-dependent error but the device-dependent error (No in step S107), the error analyzing unit 38 selects a hardware guidance as error countermeasure information, the guidance display unit 34 displays the hardware guidance (step S108), and the guidance is presented to the operator who produced the error. The content of the hardware guidance is information on a method of solving the device-dependent error, and for example, is used for prompting the operator to clean or replace the rollers of the scanner body 2 and improving the error state by performing maintenance of the scanner device 1. When the process of step S108 is completed, the present main flow ends.

On the other hand, when the presently occurred error is the operator-dependent error (Yes in step S107), the error analyzing unit 38 selects a guidance for the operator-dependent error as the error countermeasure information, the guidance display unit 34 displays the guidance for the operator-dependent error (step S109), and the guidance is presented to the operator who produced the error. The content of the guidance for the operator-dependent error is information on a method of solving the operator-dependent error, and for example, is a message for prompting the operator to check sheets before scanning, reexamine a sheet setting method or a sheet setting order, or perform fine adjustment of various settings of the scanner device 1. Moreover, if it is possible to further specify the countermeasure method using error codes, it is possible to select more appropriate countermeasure information and present the same to the operator. When the process of step S109 is completed, the present control flow ends.

Figure 11:
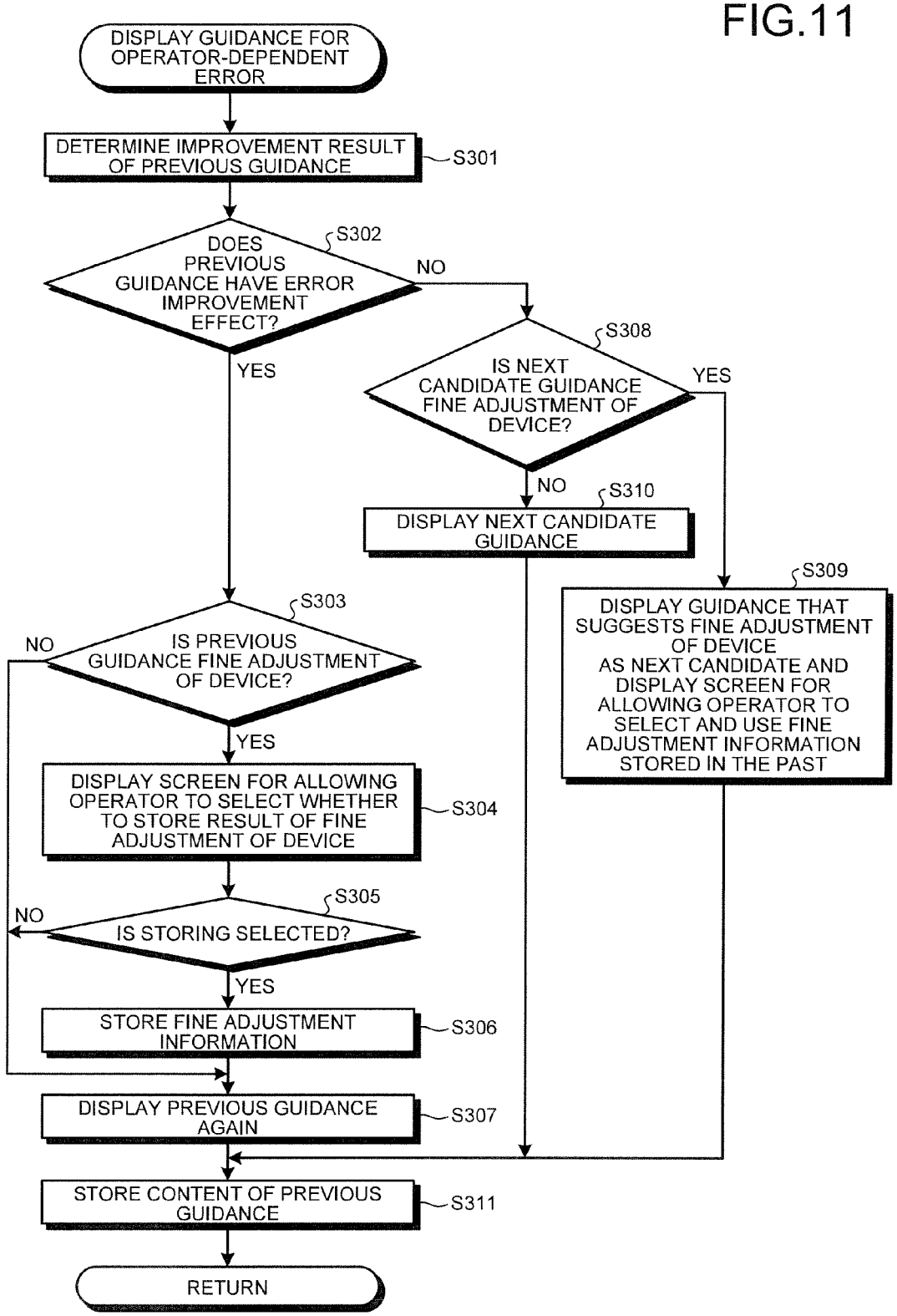
FIG. 11 is a flowchart illustrating a sub-routine process of a guidance display process of step S109 in the flowchart of FIG. 3.

In the process of step S109, a sub-routine process illustrated in FIG. 11 may be performed to present more optimal countermeasure information for the operator-dependent error to maintain the error improvement effect.

Here, the process of step S109 will be described in detail with reference to the sub-routine of FIG. 11. FIG. 11 is a flowchart illustrating the sub-routine process of the guidance display process of step S109 in the flowchart of FIG. 3.

When the occurred error is determined to be an operator-dependent error, a plurality of countermeasure methods (i) to (iii) as described below are considered as possible methods, for example:

(i) Check sheets before scanning;
(ii) Reexamine sheet setting method and order; and
(iii) Fine adjustment of various setting values of the scanner device 1 (hereinafter referred to as "fine adjustment of device").

In the sub-routine process of FIG. 11, the content of displayed guidance is selected and the effect thereof is measured to specify a most effective countermeasure method for the operator who produced an error from a plurality of candidate countermeasure methods (i) to (iii).

First, the error analyzing unit 38 determines the improvement result of a previous guidance (step S301). Here, the "previous guidance" is information on a countermeasure method among the candidate countermeasure methods selected and displayed at step S109 immediately before it is determined that the operator who produced the present error produced an operator-dependent error. The error analyzing unit 38 analyzes whether the error occurrence rate of the operator who produced the present error has decreased after the previous guidance was displayed. When a guidance for an operator-dependent error is first displayed to the operator who produced the present error, one countermeasure method is arbitrarily selected among the candidate countermeasure methods and the flow returns to the main flow.

When the previous guidance has an error improvement effect (Yes in step S302), and the previous guidance is not (iii) fine adjustment of device among the candidate countermeasure methods (No in step S303), the error analyzing unit 38 selects the previous guidance stored and recorded in advance again and the guidance display unit 34 displays the previous guidance again (step S307).

When the previous guidance has an error improvement effect (Yes in step S302), and the previous guidance is (iii) fine adjustment of device (Yes in step S303), a screen for selecting whether to store the result of the fine adjustment of device which had an error improvement effect, that is, various setting values (fine adjustment information) of the scanner device 1 after adjustment is displayed on the guidance display unit 34 (step S304). When the operator inputs an operation to select to store the fine adjustment information (Yes in step S305), the fine adjustment information is stored in the control terminal 3 (step S306), and the guidance for (iii) fine adjustment of device is displayed again similarly to the previous time (step S307). On the other hand, when the operator does not input an operation to select to store the fine adjustment information (No in step S305), the previous fine adjustment information is not stored and the guidance for (iii) fine adjustment of device is displayed again (step S307).

On the other hand, when the previous guidance does not have an error improvement effect (No in step S302), the error analyzing unit 38 selects the next candidate among the candidate countermeasure methods. The error analyzing unit 38 can select the next candidate in a predetermined order or on a random basis among the candidate countermeasure methods other than the previously selected candidate. When the guidance for the next candidate selected by the error analyzing unit 38 is (iii) fine adjustment of device (Yes in step S308), a guidance that suggests fine adjustment of device is displayed on the guidance display unit 34 as the next candidate countermeasure method, and a screen that allows operators to select and use the stored fine adjustment information which had an error improvement effect in the past is displayed on the guidance display unit 34 (step S309). When the guidance for the next candidate selected by the error analyzing unit 38 is not (iii) fine adjustment of device (No in step S308), the guidance for the next guidance is displayed on the guidance display unit 34 (step S310).

When the guidance is displayed on the guidance display unit 34 at steps S307, S309, and S310, the content of the presently displayed guidance is stored in the control terminal 3 (step S311), and the flow returns to the main flow. The information stored at step S311 is used as the content of the "previous guidance" for the next process at step S301.

In the flowchart of FIG. 11, when the effect measurement result shows that the guidance is determined to be an optimal error countermeasure method for the error characteristics of the operator, the priority of guidance display is learned and fed back so that in the subsequent processes, the content of guidance may be selected in the priority order of the effectiveness in step S308.

Moreover, when "(iii) fine adjustment of device" is determined to be effective among the guidance types, a message for prompting the other operators to restore the adjustment values (fine adjustment information) to the original values may be displayed on the guidance display unit 34. This message may be included in a guidance screen for (iii) fine adjustment of device. Alternatively, various setting values of the scanner device 1 may be stored when an operator logs into the control terminal 3, the setting values of the scanner device 1 may be acquired again when the operator logs off, and a special message may be displayed when both setting values are different.

In the flowchart of FIG. 11, when an instruction of (iii) fine adjustment of device among the countermeasure methods for the operator-dependent error is presented to the operator, and the countermeasure method has an error improvement effect, the content of the fine adjustment information applied to the scanner device 1 may be stored in the control terminal 3 as information associated with the operator so as to be reused as necessary. For example, when the sheets that an operator mainly uses are fixed to various types of patterns, and it is necessary to finely adjust the setting of the scanner device 1 for each sheet, it is possible to efficiently select an adjustment value as information associated with the operator and to easily perform the setting.

Further, if a function of transferring the setting information (fine adjustment information) of the scanner device 1 can be used, the setting information may be acquired using the function and may be stored as a setting profile associated with the operator together with supplementary information. The supplementary information may describe arbitrary information useful for selecting as scanning conditions such as a sheet type.

A GUI may be provided so that the operator can personally determine whether to store the fine adjustment information of the scanner device 1 or which fine adjustment information will be selected and be referred to or reset.

Figure 12:
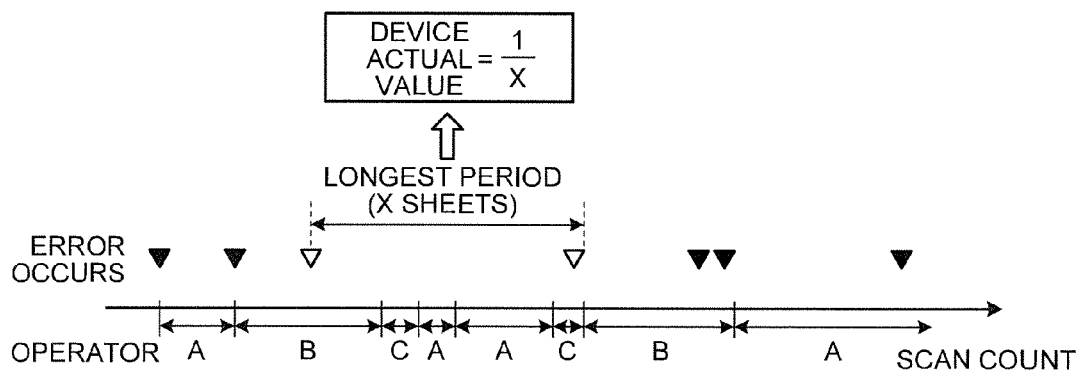
FIG. 12 is a diagram for explaining a device actual value.

Further, in the determination method B, an actual value (device actual value) unique to a device may be obtained and the error determination may be performed by taking the actual value into consideration to improve the accuracy of determining whether the error is the operator-dependent error. A method of calculating the device actual value and a method of determining the operator-dependent error in the determination method B using the device actual value will be described with reference to FIGS. 12 and 13A and 13B. FIG. 12 is a diagram for explaining the device actual value, and FIGS. 13A and 13B are diagrams for explaining criteria for determining the operator-dependent error in the determination method B taking the device actual value into consideration.

Even when there is no problem in the operator's operation order, scanning errors occur at a certain rate. Since such an error occurrence rate does not depend on the operator but depends on an individual device difference, this error occurrence rate can be regarded as an actual value (device actual value) unique to the device. This device actual value can be used as a reference value for determining whether the error occurrence rate of a specific operator is protrudingly high.

For calculating the device actual value, an error occurrence frequency in the longest period where scanning was performed without any error among all past error occurrence states of the scanner device 1 is employed. FIG. 12 is a diagram illustrating error occurrence timings in a situation where one scanner device is shared by the operators A, B, and C. In FIG. 12, the accumulated scan count of the scanner device 1 is depicted on the horizontal axis. The operation periods of the operators (A, B, and C) who performed the scan operation are illustrated along the horizontal axis, and the error occurrence timings of all operators are depicted by triangular marks. In FIG. 12, the error occurrence frequency in the period where the error occurrence interval is longest is an error rate that indicates the actual value unique to the device. As illustrated in FIG. 12, when the total scan count of this period is X, the device actual value can be calculated as 1/X.

Figure 13A:
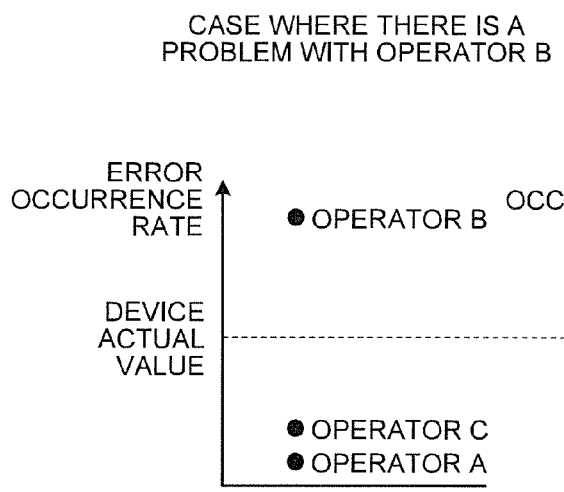
FIG. 13A is a diagram for explaining criteria for determining an operator-dependent error in a determination method B taking a device actual value into consideration, in a case having a problem with operator B.
Figure 13B:
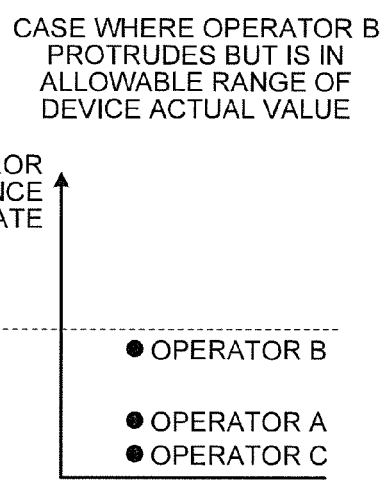
FIG. 13B is a diagram for explaining criteria for determining an operator-dependent error in a determination method B taking a device actual value into consideration, in a case where operator B protrudes in an allowable range of the device actual value.

FIGS. 13A and 13B are diagrams illustrating cases where the protruding degree of the specific operator (the operator B in FIGS. 13A and 13B) is high. The determination method B taking the device actual value into consideration determines that the error is an operator-dependent error (FIG. 13A) and is not the operator-dependent error (FIG. 13B). In FIGS. 13A and 13B, the vertical axis represents the error occurrence rate, and the error occurrence rates of the operators A, B, and C are plotted by black circles. Moreover, the device actual value is depicted by a dot line.

As illustrated in FIG. 13B, even when the protruding degree of a specific operator (the operator B in FIGS. 13A and 13B) is higher than that of the other operators, if the error occurrence rate of this operator is within the range of the device actual value, it can be considered that the error occurrence rate is in an allowable range of the device-dependent error. In this case, the error produced by the operator B can be determined to be the device-dependent error rather than the operator-dependent error. On the other hand, as illustrated in FIG. 13A, when the protruding degree of the specific operator is higher than that of the other operators, and the error occurrence rate of this operator is higher than the device actual value, it can be considered that the scan operation of the operator produced an error that exceeds the device actual value, and thus, exceeds the allowable range of the device-dependent error. In this case, the error produced by the operator B can be determined to be the operator-dependent error.

Next, the effect of the scanner device 1 according to the present embodiment will be described.

The scanner device 1 of the present embodiment includes the information storage unit 35 that stores, in an associated manner, error information on errors occurred due to a previous scan operation and operator information on an operator who produced errors, and the error analyzing unit 38 that determines whether an error occurred due to a scan operation of a specific operator is an operator-dependent error, based on the error information and the operator information stored in the information storage unit 35.

With this configuration, since the error information and the operator information are stored in the information storage unit 35 in correlation as the storage information, and the type of the error is determined based on the storage information, it is possible to understand the trend of errors occurred due to the scan operation for each operator. In this manner, it is possible to determine whether an error occurred due to the scan operation of the specific operator is an operator-dependent error or an error resulting from other factors so that it is possible to determine the error factor with high accuracy.

The scanner device 1 of the present embodiment includes the guidance display unit 34 that presents countermeasure information for an error occurred due to an image reading operation of the specific operator to the specific operator, and the error analyzing unit 38 switches the countermeasure information that the guidance display unit 34 presents to the specific operator depending on the result of determination on whether the error is the operator-dependent error.

With this configuration, since different countermeasure information can be presented between when the error occurred due to the scan operation of the specific operator is the operator-dependent error and when the error is not the operator-dependent error, it is possible to present effective information for solving errors to the operator.

Moreover, in the scanner device 1 of the present embodiment, a plurality of items of countermeasure information is provided for the operator-dependent error, and when the error analyzing unit 38 determines that the error produced by the specific operator is the operator-dependent error, one countermeasure information is selected among the items of countermeasure information and presented to the specific operator, and an error improvement effect of the presented countermeasure information is used as criteria for determining whether the countermeasure information presented to the specific operator is to be switched to another countermeasure information among the items of countermeasure information.

With this configuration, since a plurality of items of countermeasure information can be provided to the operator-dependent error, it is possible to deal with various errors dependent on the operator. Moreover, since the countermeasure information presented to the operator is appropriately switched in response to the error improvement effect, it is possible to present a guidance more suitable for the error occurrence state.

In the scanner device 1 of the present embodiment, the error analyzing unit 38 calculates the trend of the error occurrence rate of each operator based on the error information and the operator information stored in the information storage unit 35 and determines that the error occurred due to the image reading operation of the specific operator is a device-dependent error when the error occurrence rates of all operators show an upward trend.

With this configuration, since the trend of the occurrence of the device-dependent error can be recognized accurately, it is possible to identify the device-dependent error with high accuracy and to improve the accuracy of determining the factor of the error occurred due to the image reading operation of the specific operator.

In the scanner device 1 of the present embodiment, the error analyzing unit 38 calculates the trend of the error occurrence rate of each operator based on the error information and the operator information stored in the information storage unit 35, and determines that the error occurred due to the image reading operation of the specific operator is an operator-dependent error when the error occurrence rate of the specific operator shows such a trend that it is protrudingly higher than the error occurrence rates of the other operators.

With this configuration, since the trend of the occurrence of the operator-dependent error can be recognized accurately, it is possible to identify the operator-dependent error with high accuracy and to improve the accuracy of determining the factor of the error occurred due to the image reading operation of the specific operator.

In the first embodiment, as illustrated in FIG. 4, although the determination method B (steps S205 and S206) is performed to determine whether the occurred error is an operator-dependent error after the error is determined not to be a device-dependent error in the determination method A (steps S201 to S204), only one of the determination methods A or B may be performed.

Second Embodiment

Next, a second embodiment of the invention will be described with reference to FIGS. 14 to 19. In the second embodiment, a scanner system 10 will be described as an example of an image reading system in which a server manages a plurality of image reading devices in a centralized manner.

Figure 14:
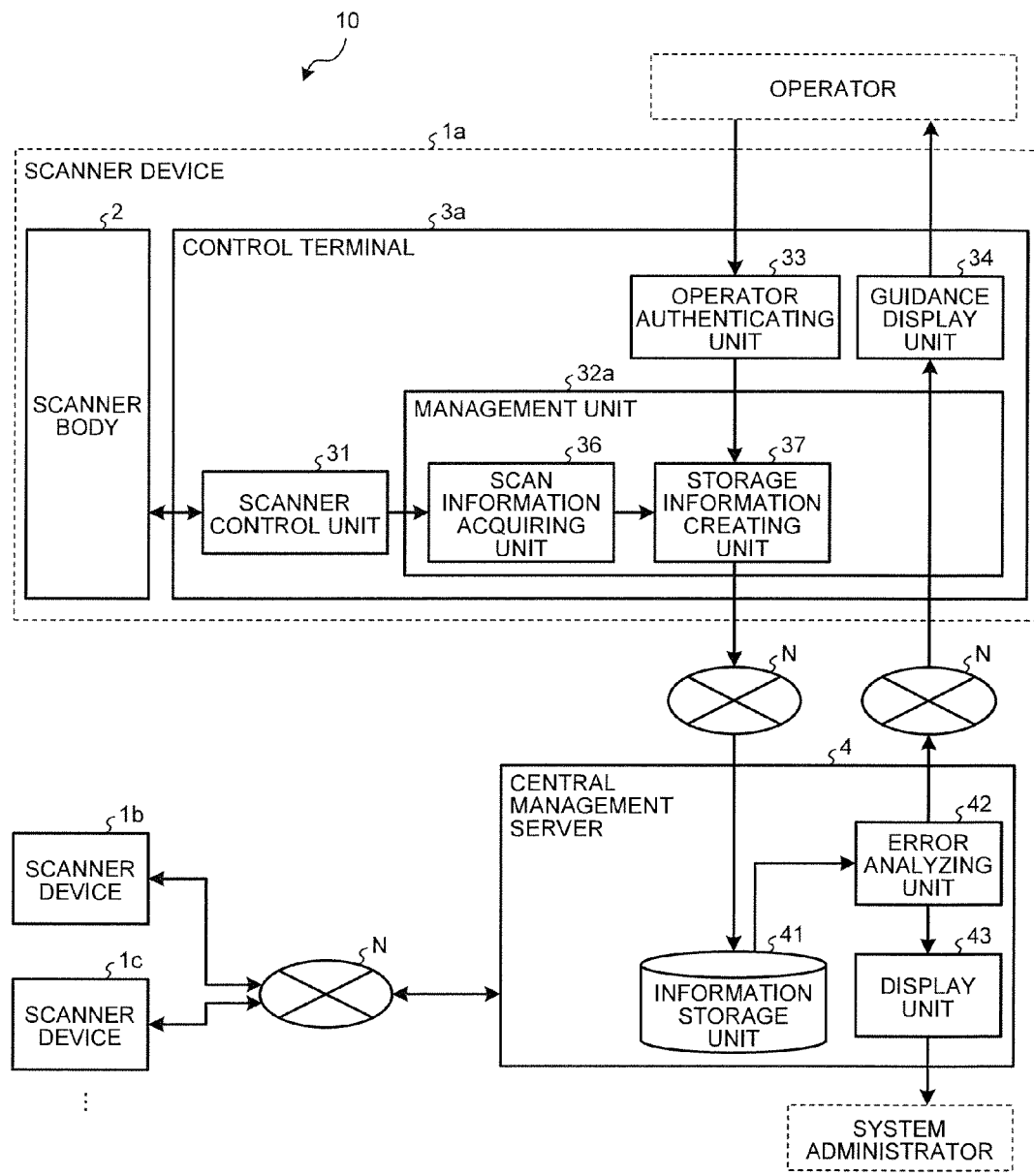
FIG. 14 is a functional block diagram of a scanner system as an example of an image reading system according to a second embodiment of the invention.

The configuration of the scanner system 10 according to the present embodiment will be described with reference to FIGS. 14 and 15. FIG. 14 is a functional block diagram of a scanner system as an example of the image reading system according to the second embodiment, and FIG. 15 is a diagram illustrating an example of the configuration of storage information stored in an information storage unit in FIG. 14.

As illustrated in FIG. 14, the scanner system 10 includes a plurality of scanner devices 1a, 1b, and 1c and a central management server 4. The scanner devices 1a, 1b, and 1c are communicably connected to the central management server 4 via a network N such as an Internet circuit or an intranet circuit.

Each of the scanner devices 1a, 1b, and 1c includes the scanner body 2 and a control terminal 3a. The control terminal 3a is configured to realize the respective functions of the scanner control unit 31, the management unit 32a, the operator authenticating unit 33, and the guidance display unit 34. The management unit 32a is configured to realize the respective functions of the scan information acquiring unit 36 and the storage information creating unit 37. That is, the scanner devices 1a, 1b, and 1c are different from the scanner device 1 of the first embodiment in that the scanner devices do not include the information storage unit 35 (refer to FIG. 1) that stores storage information related to a scan operation and the error analyzing unit 38 (refer to FIG. 1) that determines the type of an error occurred due to the scan operation and selects countermeasure information corresponding to the error type. In FIG. 14, for the sake of convenience, although three scanner devices 1a, 1b, and 1c are illustrated as the plurality of scanner devices, the number of scanner devices is not limited thereto.

The central management server 4 collectively stores and manages the storage information related to the scan operation from the scanner devices 1a, 1b, and 1c connected via the network N and collectively performs the error determination and selects countermeasure information for the respective scanner devices 1a, 1b, and 1c. The central management server 4 includes an information storage unit 41, an error analyzing unit 42, and a display unit 43.

The information storage unit 41 collects and collectively stores the storage information created by the storage information creating unit 37 of each of the scanner devices 1a, 1b, and 1c. As illustrated in FIG. 15, the information storage unit 41 stores the respective items of "scanner device," "scan execution time," "operator," "scan count," "error occurrence time," and "error code" in correlation as the storage information. That is, the storage information stored in the information storage unit 41 has a configuration in which "scanner device (device information)" for specifying a scanner device that performs a scan operation is added to the items of the storage information in the information storage unit 35 of the first embodiment.

The error analyzing unit 42 collectively determines the types of occurred errors and selects countermeasure information for each of the scanner devices 1a, 1b, and 1c. When the countermeasure information is selected according to the error information and the operator information received from a scanner device (any one of the scanner devices 1a, 1b, and 1c) where the error has occurred, the error analyzing unit 42 outputs the information to the guidance display unit 34 of the corresponding scanner device.

Moreover, in the error determination, the error analyzing unit 42 determines the type of errors using the determination methods A and B similarly to the error analyzing unit 38 of the first embodiment and further performs error determination using a determination method C. According to the determination method C, when an error produced by a specific operator occurs in a specific scanner device, the error type is determined by considering an error occurrence history of the operator even in other scanner devices of the scanner system 10. Details of the determination method C will be described with reference to FIGS. 17 to 19.

The display unit 43 presents information such as the error determination result of the error analyzing unit 42 and countermeasure information output to the scanner devices 1a, 1b, and 1c to a system administrator of the scanner system 10.

Figure 16:
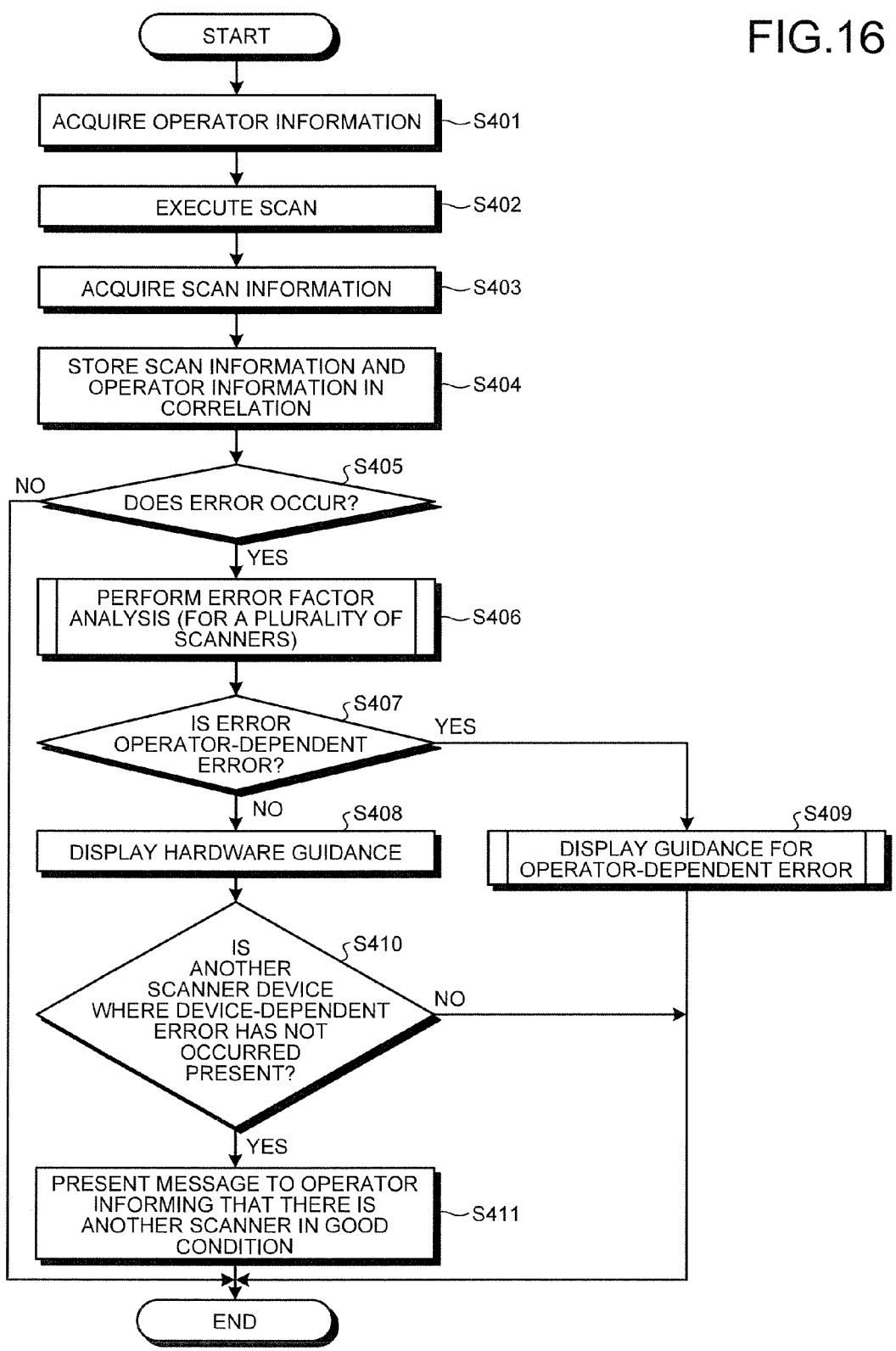
FIG. 16 is a flowchart of an error determining process and a guidance presenting process performed by the scanner system of the present embodiment.

Next, the operation of the scanner system 10 according to the present embodiment will be described with reference to FIGS. 16 to 19. FIG. 16 is a flowchart of an error determining process and a guidance presenting process performed by the scanner system according to the present embodiment. The control flow illustrated in the flowchart of FIG. 16 is performed by the central management server 4 and the management unit 32a of the control terminal 3a of any one of the plurality of scanner devices 1a, 1b, and 1c when an arbitrary operator performs a scan operation using any one of the scanner devices. In this example, a case where the scan operation is performed using the scanner device 1a will be described. Hereinafter, the error determining process and the guidance presenting process performed by the scanner system 10 will be described according to the flowchart of FIG. 16.

The processes of steps S401 to S403 are the same as those of steps S101 to S103 of the first embodiment, and description thereof will not be provided.

At step S403, when the scan information is acquired by the scan information acquiring unit 36 of the scanner device 1a, the storage information creating unit 37 of the scanner device 1a stores the scan information acquired at step S403 in the information storage unit 41 of the central management server 4 in correlation with the operator information acquired at step S401 (step S404). The storage information creating unit 37 of the scanner device 1a creates storage information that correlates the scan information with the operator information and outputs the created storage information to the information storage unit 41 of the central management server 4. In the information storage unit 41 of the central management server 4, the items of storage information input from the scanner devices 1a, 1b, and 1c are collectively stored. The storage information stored in the information storage unit 41 is information, for example, that correlates the items of "scanner device," "scan execution time," "operator," "scan count," "error occurrence time," "error code," with each other as illustrated in FIG. 15.

Subsequently, the error analyzing unit 42 of the central management server 4 checks whether an error has occurred in the present scan operation (step S405). The error analyzing unit 42 determines the presence of error occurrence based on the scan information acquired at step S403, for example. When an error has not occurred in the present scan operation (No in step S405), the present control flow ends. On the other hand, when an error has occurred in the present scan operation (Yes in step S405), then the factor of the error is analyzed (step S406).

Figure 17:
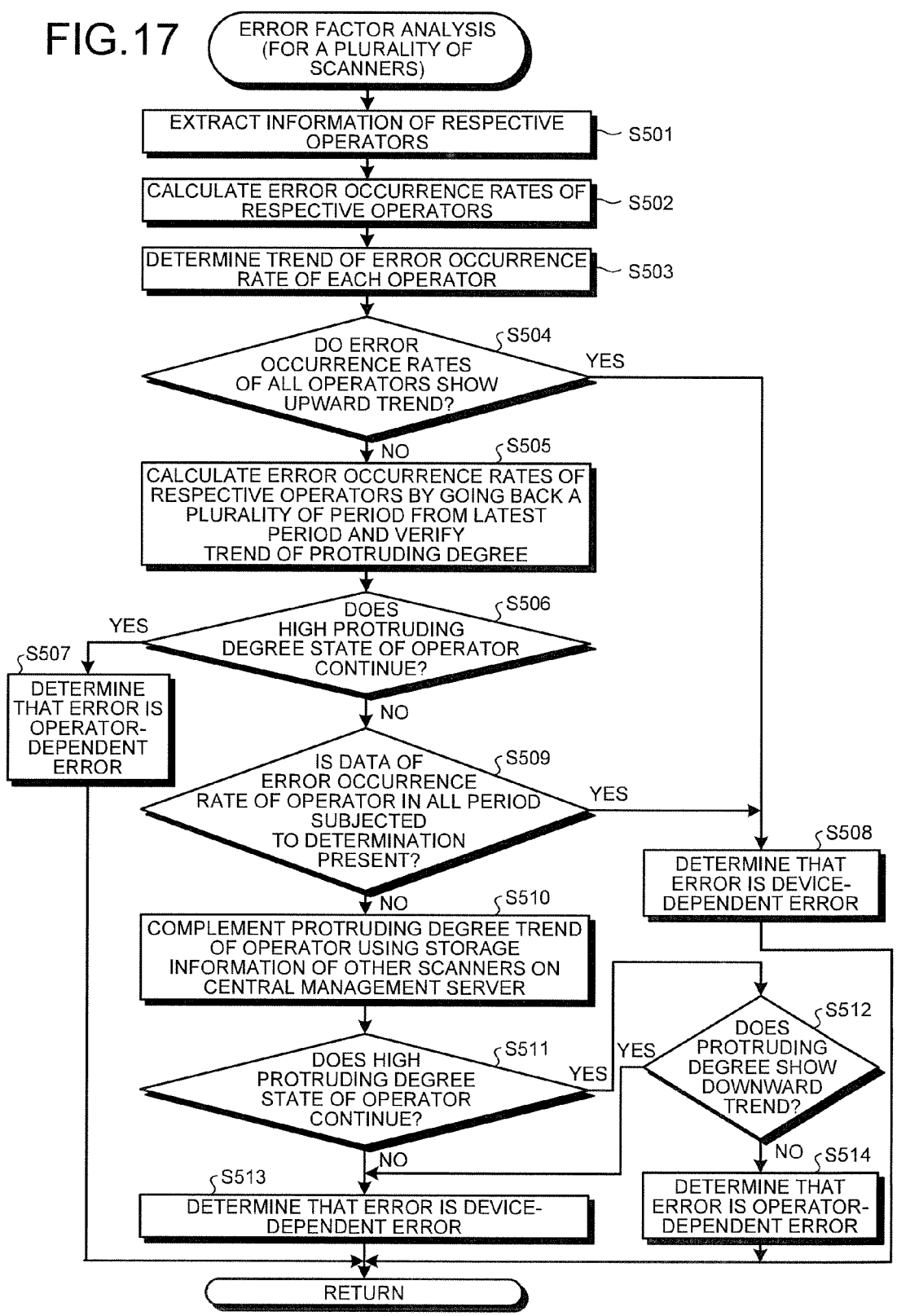
FIG. 17 is a flowchart illustrating a sub-routine process of an error factor analyzing process of step S406 in the flowchart of FIG. 16.

Here, the error factor analyzing process at step S406 will be described in detail with reference to FIG. 17. FIG. 17 is a flowchart illustrating a sub-routine process of the error factor analyzing process at step S406 in the flowchart of FIG. 16.

In the error factor analyzing process at step S406, the error analyzing unit 42 of the central management server 4 determines the factor of the error occurred using determination method C in addition to the determination methods A and B of the first embodiment. According to the determination method C, the information on the other scanner devices managed by the central management server 4 in addition to the scanner device where the error has occurred is used. In the determination method C, the trend of the protruding degree of the operator is complemented using the scanning state of the operator in other scanner devices. Moreover, by determining whether the error occurred is an operator-dependent error based on the complemented trend of the protruding degree, the determination accuracy can be improved.

In the error factor analyzing process at step S406, specifically, the error analyzing unit 42 of the central management server 4 executes a sub-routine process "error factor analysis (for a plurality of scanners)" illustrated in the flowchart of FIG. 17.

As illustrated in the flowchart of FIG. 17, in the error factor analyzing process at step S406, similarly to the flowchart of FIG. 4 of the first embodiment, first, error determination is performed according to the determination method A (steps S501 to S504) and it is determined whether a device-dependent error has occurred. Subsequently, error determination is performed according to the determination method B (steps S505 and S506), and it is determined whether an operator-dependent error has occurred. When it was not possible for the determination method B to determine whether the operator-dependent error has occurred, the error determination is performed according to the determination method C (steps S509 to S514) to complement the trend of the protruding degree of the operator using the error occurrence states of the other scanner devices, and it is determined again whether the operator-dependent error has occurred.

The processes at steps S501 to S508 are the same as those of steps S201 to S208 of the first embodiment, and the description thereof will not be provided. That is, in this example, the process of the determination method C will be described.

When the determination result of step S506 shows that the high protruding degree state of the operator does not occur continuously (No in step S506), it is checked whether the data of the error occurrence rates of the operator for all periods subjected to the determination is present (step S509). The error analyzing unit 42 checks whether the data of the error occurrence rate of the operator is included for all period subjected to the error determination based on the error occurrence rates of the respective operators calculated at step S505 and determines that the data of the error occurrence rate of the operator for all period subjected to the determination is not present when the data is not present for a part of the periods. When the determination result of step S509 shows that the data of the error occurrence rates of the operator for all period subjected to the determination is present (Yes in step S509), it is determined that the determination at step S506 is performed based on appropriate data and that the error is not an operator-dependent error but a device-dependent error (step S508), and the flow returns to the main flow.

On the other hand, when the determination result of step S509 shows that the data of the error occurrence rates of the operator for all period subjected to the determination is not present (No in step S509), it is determined that the determination at step S506 is performed based on insufficient data, and the trend of the protruding degree of the operator is complemented using the items of storage information of other scanners on the central management server 4 (step S510). If the storage information stored in the information storage unit 41 includes a history in which the operator has performed a scan operation using another scanner device in the period used for the error determination at step S506, the error analyzing unit 42 extracts the history information and recalculates the trend of the protruding degree of the operator. When the trend of the protruding degree of the operator is recalculated, the information obtained from a scanner device of which the device-dependent error occurrence rate is already in the upward trend is excluded. This is because, in a state where the proportion of the device-dependent error included in the entire errors has increased, since the proportion of the operator-dependent error included in the entire errors decreases, it is difficult to accurately determine the trend of the protruding degree due to the operator factors.

It is determined again whether the high protruding degree state of the operator occurs continuously based on the trend of the protruding degree of the operator complemented at step S510 (step S511). When the determination result shows that the high protruding degree state of the operator does not occur continuously (No in step S511), since the requirements of the determination method C are not met, it is determined that the error occurred presently is not the operator-dependent error but the device-dependent error (step S513), and the flow returns to the main flow.

On the other hand, when the determination result of step S511 shows that the high protruding degree state of the operator occurs continuously (Yes in step S511), it is determined whether the trend of the protruding degree shows a downward trend (step S512).

In the determination methods B and C, when the magnitude of the protruding degree is determined, a protruding degree threshold is set and the protruding degree of the specific operator is classified into a state where it protrudes from those of the other operators and a state where it is in the same level as the other operators. However, there is a certain range where the relation between the error occurrence rates of the respective operators is in the middle of the two states and it is difficult to determine the state to which the error occurrence rate is to be classified. In order to improve the determination accuracy of such a case, at step S512, the change in the trend of the protruding degree is checked. Specifically, when the trend of the protruding degree is in the downward trend, it is not determined that the error occurred is the operator-dependent error. Even when it is not possible to determine whether the latest protruding degree is to be classified into a protruding state or the same level as the other operators, if the trend of the protruding degree is in the downward trend, this state can be regarded as being in the course where the error improvement effect from the previous protruding state appears, and it is thus not necessary to provide a new guidance. On the other hand, when the trend of the protruding degree is constant or in the upward trend, since the error trend is not improved, it is determined that the error is the operator-dependent error.

When the determination result of step S512 shows that the trend of the protruding degree of the operator shows a downward trend (Yes in step S512), it is determined that the error occurred presently is not the operator-dependent error but the device-dependent error (step S513), and the flow returns to the main flow. On the other hand, when the trend of the protruding degree of the operator does not show a downward trend (No in step S512), it is determined that the error occurred presently is the operator-dependent error (step S514), and the flow returns to the main flow.

Figure 18:
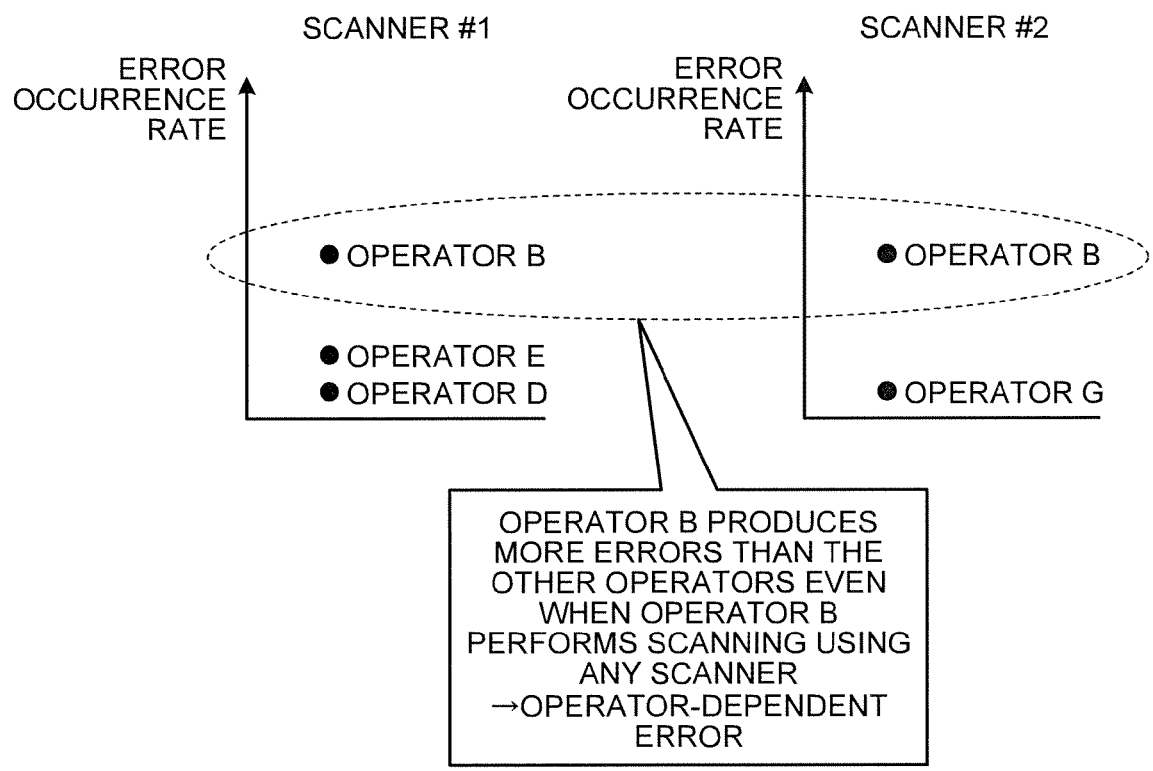
FIG. 18 is a diagram for explaining an error distribution in a plurality of scanner devices, of an operator that produces an operator-dependent error.

Here, the concept of the determination method C will be described in further detail with reference to FIGS. 18 and 19. FIG. 18 is a diagram for explaining an error trend in a plurality of scanner devices of an operator who produced an operator-dependent error, and FIG. 19 is a diagram for explaining a method of determining the trend of the protruding degree of the operator from the error occurrence states in a plurality of scanner devices.

FIG. 18 is a diagram illustrating the trend of the protruding degree of a specific operator (in FIG. 18, the operator B) in two scanner devices (scanners #1 and #2). As illustrated in FIG. 18, it is considered that an operator who is likely to produce the operator-dependent error has a higher error occurrence rate and shows a higher protruding degree trend than the other operators even when the operator performs a scan operation using any scanner device.

Figure 19:
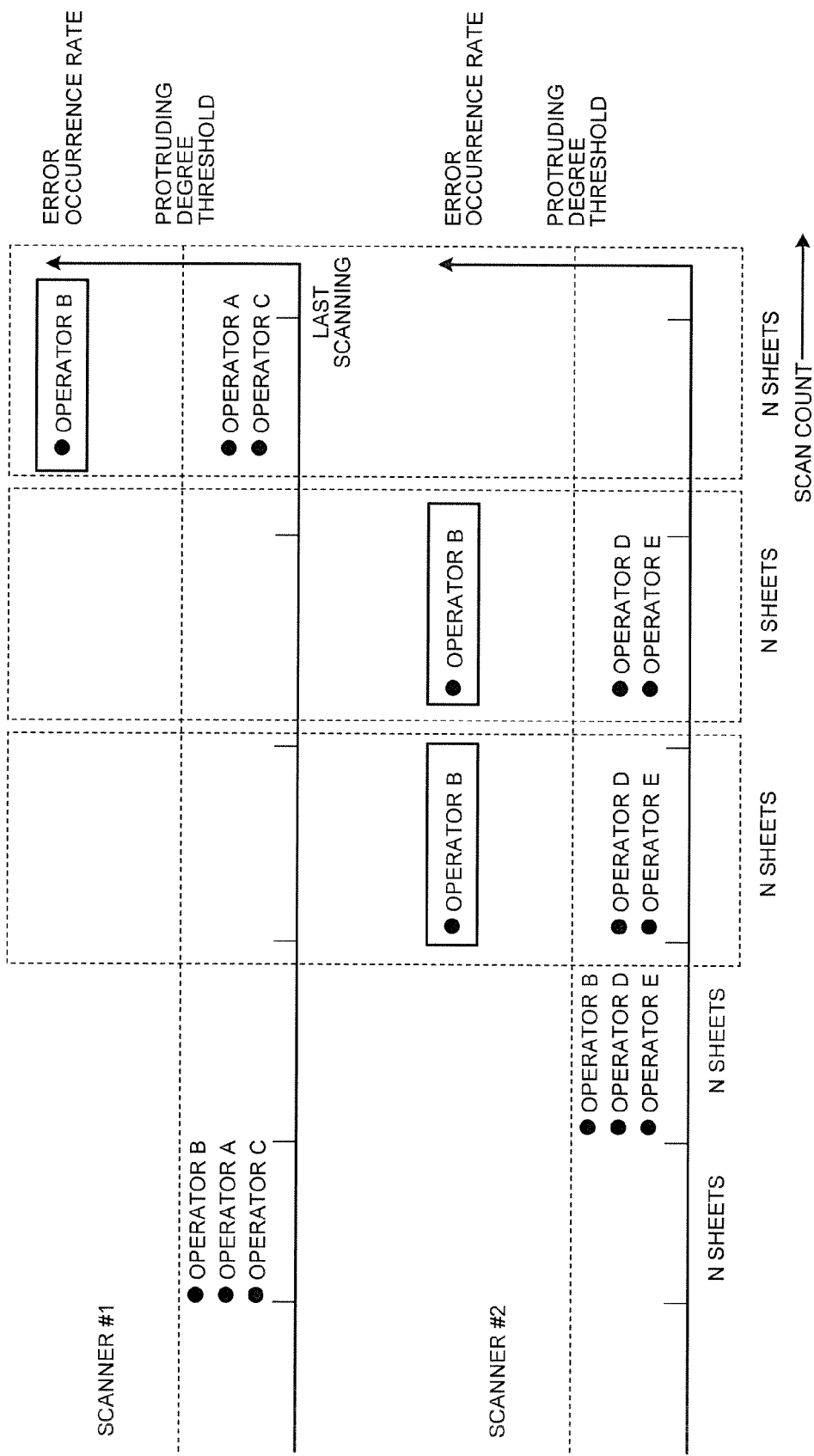
FIG. 19 is a diagram for explaining a method of determining a trend of the protruding degree of an operator from an error occurrence state of a plurality of scanner devices.

Therefore, as illustrated in FIG. 19, in the determination method C, the error determination accuracy is improved based on the trend of the protruding degree of the specific operator over a plurality of scanner devices. FIG. 19 is a diagram illustrating the error occurrence rates of the respective operators over a plurality of period in two scanner devices (scanners #1 and #2). In this example, it is assumed that the trend of the protruding degree of the operator B is checked using three recent periods surrounded by dot lines in the drawing.

As illustrated in FIG. 19, the operator B who is presently being focused performs a scan operation using the scanner #1 at this time. However, a case where the operator B has performed the scan operation mainly using the scanner #2 in the previous period and has no scanning history for the scanner #1 for a long period up to now will be considered. In this case, looking at the protruding degree trend of the scanner #1 used at this time, since the operator B has a high protruding degree for only one recent period and has no use history for the scanner #1 in the past two periods, the criteria of the determination method B are not met, and it cannot be determined that the occurred error is the operator-dependent error. However, the operator B also shows an error trend of a high protruding degree with the other scanner #2 in the further previous two periods. That is, looking at the scanners #1 and #2 collectively, the trend of the protruding degree of the operator B actually shows a high protruding degree state, and the operator B is highly likely to produce the operator-dependent error.

In the determination method C, when the data of the error occurrence rate of the operator in the specific scanner device (the scanner #1 in FIG. 19) where the present error has occurred is not present in at least a part of a predetermined period in which the error determination is performed according to the determination method B, the trend of the protruding degree of the operator is contemplated by referring to the error occurrence history of the other scanner device (the scanner #2 of FIG. 19). Moreover, it is determined again whether the occurred error is the operator-dependent error using the contemplated trend of the protruding degree.

The flow returns to the main flow of FIG. 16. The processes of steps S407 to S409 are the same as those of steps S107 to S109 of the first embodiment, and the description thereof will not be provided. At step S408, the guidance display unit 34 displays a hardware guidance, and then, the central management server 4 checks whether another scanner device where the device-dependent error has not occurred is present (step S410). The error analyzing unit 42 of the central management server 4 calculates the error occurrence rate using the storage information stored in the information storage unit 41 for another scanner device other than the scanner device where the present error has occurred and determines whether the device-dependent error has occurred.

When another scanner device where the device-dependent error has not occurred is present (Yes in step S410), the error analyzing unit 42 of the central management server 4 outputs the information on the other scanner device where the device-dependent error has not occurred to the guidance display unit 34 of the scanner device 1a operated by the operator, and the guidance display unit 34 presents a message to the operator informing that there is another scanner in a good condition (step S411). The operator can use the other scanner device in a relatively good condition, in which the device-dependent error has not occurred, by referring to the presented information. When the process of step S411 is completed, the present control flow ends.

On the other hand, when another scanner device where the device-dependent error has not occurred is not present (No in step S410), only the hardware guidance is displayed on the guidance display unit 34, and the present control flow ends.

At steps S410 to S411, when a plurality of other scanner devices where the device-dependent error has not occurred is present, the error analyzing unit 42 may select a scanner device in the best condition based on predetermined determination criteria such as one having the lowest error occurrence rate and present the selected scanner device to the operator. Moreover, when it is not possible to immediately perform countermeasures (cleaning or replacement of components) corresponding to the hardware guidance with respect to the scanner device 1a where the present error has occurred, the operator may be recommended to use another scanner device in a good condition.

Next, the effect of the scanner system 10 according to the present embodiment will be described.

The scanner system 10 of the present embodiment includes the scanner devices 1a, 1b, and 1c and the central management server 4 that controls these scanner devices 1a, 1b, and 1c. The information storage unit 41 and the error analyzing unit 42 are provided in the central management server 4. The information storage unit 41 stores the error information and the operator information in correlation with the device information for specifying a scanner device that performs a scan operation. The error analyzing unit 42 determines an error produced by a specific operator who operates one of the scanner devices 1a, 1b, and 1c is an operator-dependent error based on the error information and the operator information stored in the information storage unit 41.

With this configuration, the items of storage information related to the scan operation can be collectively stored in the information storage unit 41 with respect to all scanner devices 1a, 1b, and 1c managed by the central management server 4. Moreover, the error analyzing unit 42 of the central management server 4 can collectively perform countermeasures to the errors occurring due to the scan operation in the respective scanner devices 1a, 1b, and 1c. In this manner, by integrating the functions in the central management server 4, it is possible to efficiently select and present an error determining process and a countermeasure method.

The error analyzing unit 42 acquires a trend of an error occurrence rate for each operator calculated based on the error information and the operator information stored in the information storage unit 41 with respect to each of the scanner devices 1a, 1b, and 1c and determines that the error occurred due to an image reading operation of the specific operator is an operator-dependent error when the trend of the error occurrence rate of the specific operator in the scanner devices 1a, 1b, and 1c is protrudingly higher than that of the error occurrence rates of the other operators.

With this configuration, since the trend of the protruding degree of the operator can be exactly detected even when the specific operator uses the scanner devices 1a, 1b, and 1c, it is possible to identify the operator-dependent error with high accuracy, and to improve the accuracy of determining the factor of the error occurred due to the image reading operation of the specific operator.

In the second embodiment, although a configuration in which the central management server 4 includes the information storage unit 41 and the error analyzing unit 42 is illustrated, at least one of the information storage unit 41 and the error analyzing unit 42 may be included in each of the scanner devices 1a, 1b, and 1c. For example, when the scanner devices 1a, 1b, and 1c individually includes the information storage unit 41, the error analyzing unit 42 of the central management server 4 acquires the storage information from the information storage unit in each of the scanner devices 1a, 1b, and 1c and performs error determination for the operator. Moreover, when the scanner devices 1a, 1b, and 1c individually include the error analyzing unit 42, the error analyzing unit of the scanner device in which the operator performs a scan operation acquires the storage information from the information storage unit 41 of the central management server 4 or from the information storage unit of another scanner device when the information storage unit 41 is distributed to the respective scanner devices 1a, 1b, and 1c and performs error determination for the operator.

In the second embodiment, as illustrated in FIG. 17, although the determination method B (steps S505 and S506) is performed to determine whether the occurred error is an operator-dependent error, and subsequently, the determination method C (steps S509 to S514) is performed after the error is not determined to be a device-dependent error in the determination method A (steps S501 to S504), only one of the determination methods A, B, and C may be performed.

In the above-described embodiments, when an error occurs during the scan operation (image reading operation) of the operator, the content of a guidance (countermeasure information) is determined according to the error type (operator-dependent error or device-dependent error) and the guidance is presented to the operator. However, the error determining process and the countermeasure information presenting process may be performed in periods other than when the error occurs. For example, the error determining process and the countermeasure information presenting process may be performed based on the past use history of the operator when the operator uses a scanner device and when the scanner device completes an operator authentication operation.

In the above-described embodiments, in the scanner devices 1 and 1a, the control terminal 3 is provided separately from the scanner body 2 and communicates with the scanner body 2 to control the respective constituent components of the scanner body 2. However, the control terminal 3 may be integrated into the scanner body 2.

In the above-described embodiments, although the scanner devices 1 and 1a to 1c are illustrated as an example of the image reading device, the image reading device may be a device capable of reading a reading target medium to generate image information or to print the same on another medium and may include a copying machine, a fax machine, a character recognition device, or the like in addition to the scanner device.

According to the image reading device of the embodiment of the invention, since it is possible to determine whether an error occurred due to an image reading operation is an operator-dependent error or an error due to another factor, it is possible to determine the error factor with high accuracy.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image reading device comprising:
   a storage unit that stores, in an associated manner, error information on errors occurred due to past image reading operations and operator information on operators who produced the errors; and
   a determining unit that determines whether an error occurred due to the image reading operation of a specific operator among the operators is an operator-dependent error, based on the error information and the operator information stored in the storage unit, wherein
   the determining unit calculates a trend of an error occurrence rate for each operator, based on the error information and the operator information stored in the storage unit, and determines that the error occurred due to the image reading operation of the specific operator is a device-dependent error when the error occurrence rates of all the operators show an upward trend, or the operator-dependent error when the error occurrence rate of the specific operator shows such a trend that it is protrudingly higher than error occurrence rates of other operators.

2. The image reading device according to claim 1, further comprising:
   a presenting unit that presents countermeasure information for the error occurred due to the image reading operation of the specific operator to the specific operator,
   wherein the countermeasure information presented to the specific operator by the presenting unit is switched according to the result of the determination by the determining unit on whether the error is the operator-dependent error.

3. The image reading device according to claim 1,
   wherein a plurality of items of countermeasure information are provided for the operator-dependent error,
   wherein when the determining unit determines that the error produced by the specific operator is the operator-dependent error, one of the items of countermeasure information is selected and presented to the specific operator, and wherein an error improvement effect of the one countermeasure information presented is used as criterion for determining whether the countermeasure information presented to the specific operator is to be switched to another countermeasure information among the items of countermeasure information.

4. An image reading system comprising:

a plurality of image reading devices each of which includes:
- a storage unit that stores, in an associated manner, error information on errors occurred due to past image reading operations and operator information on operators who produced the errors; and
- a determining unit that determines whether an error occurred due to the image reading operation of a specific operator among the operators is an operator-dependent error, based on the error information and the operator information stored in the storage unit, wherein
the determining unit calculates a trend of an error occurrence rate for each operator, based on the error information and the operator information stored in the storage unit, and determines that the error occurred due to the image reading operation of the specific operator is a device-dependent error when the error occurrence rates of all the operators show an upward trend, or the operator-dependent error when the error occurrence rate of the specific operator shows such a trend that it is protrudingly higher than error occurrence rates of other operators; and a server that controls the image reading devices.

5. An image reading system comprising a plurality of image reading devices; and a server that controls the plurality of image reading devices, the server including:
- a storage unit that stores, in an associated manner, error information on errors occurred due to past image reading operations, operator information on operators who produced the errors and device information for specifying an image reading device that has performed the image reading operation; and
- a determining unit that determines whether an error occurred due to the image reading operation of a specific operator among the operators who operates one of the image reading devices is an operator-dependent error, based on the error information and the operator information stored in the storage unit, wherein
the determining unit calculates a trend of an error occurrence rate for each operator, based on the error information and the operator information stored in the storage unit, and determines that the error occurred due to the image reading operation of the specific operator is a device-dependent error when the error occurrence rates of all the operators show an upward trend, or the operator-dependent error when the error occurrence rate of the specific operator shows such a trend that it is protrudingly higher than error occurrence rates of other operators.

6. A non-transitory computer-readable recording medium that stores therein an error determination program for determining a type of an error occurring in an image reading device due to an image reading operation of an operator, the program causing a computer to execute the steps of:

storing, in an associated manner, error information on errors occurred due to past image reading operations and operator information on operators who produced the errors in a storage unit; and determining whether an error produced by a specific operator who performs an image reading operation among the operators is an operator-dependent error, based on the error information and the operator information stored in the storage unit, wherein the determining includes;
- calculating a trend of an error occurrence rate for each operator, based on the error information and the operator information stored in the storage unit, and
- determining that the error occurred due to the image reading operation of the specific operator is a device-dependent error when the error occurrence rates of all the operators show an upward trend, or the operator-dependent error when the error occurrence rate of the specific operator shows such a trend that it is protrudingly higher than error occurrence rates of other operators.

* * * * *